United States Patent
Casanova et al.

(10) Patent No.: US 11,066,257 B2
(45) Date of Patent: Jul. 20, 2021

(54) CONTAINER TRANSPORT SYSTEM

(71) Applicants: Victor Casanova, Lynwood, CA (US); Jorge Casanova, Lynwood, CA (US); Gary Dee Gates, Prescott Valley, AZ (US); Von Roy Christiansen, Jr., Prescott Valley, AZ (US)

(72) Inventors: Victor Casanova, Lynwood, CA (US); Jorge Casanova, Lynwood, CA (US); Gary Dee Gates, Prescott Valley, AZ (US); Von Roy Christiansen, Jr., Prescott Valley, AZ (US)

(*) Notice: Subject to any disclaimer, the term of this patent is extended or adjusted under 35 U.S.C. 154(b) by 168 days.

(21) Appl. No.: 16/391,321

(22) Filed: Apr. 23, 2019

(65) Prior Publication Data

US 2019/0367298 A1 Dec. 5, 2019

Related U.S. Application Data

(60) Provisional application No. 62/678,712, filed on May 31, 2018.

(51) Int. Cl.
| | |
|---|---|
| *B60P 3/40* | (2006.01) |
| *B65G 67/20* | (2006.01) |
| *F16M 11/22* | (2006.01) |
| *B60D 1/167* | (2006.01) |
| *B62D 63/04* | (2006.01) |
| *B62D 63/06* | (2006.01) |
| *B62D 33/02* | (2006.01) |
| *B60P 3/00* | (2006.01) |
| *B65D 88/12* | (2006.01) |
| *B65D 90/00* | (2006.01) |
| *B60D 1/46* | (2006.01) |

(52) U.S. Cl.
CPC .......... *B65G 67/20* (2013.01); *B60D 1/1675* (2013.01); *B60D 1/465* (2013.01); *B60P 3/00* (2013.01); *B62D 33/02* (2013.01); *B62D 63/04* (2013.01); *B62D 63/06* (2013.01); *B65D 88/121* (2013.01); *B65D 90/0026* (2013.01); *B65D 90/0033* (2013.01); *F16M 11/22* (2013.01); *B65G 2201/0235* (2013.01)

(58) Field of Classification Search
CPC ................................ B60D 1/1675; B60P 3/40
USPC ........................................................ 414/458
See application file for complete search history.

(56) References Cited

U.S. PATENT DOCUMENTS

| | | | | |
|---|---|---|---|---|
| 3,253,668 A | * | 5/1966 | Tantlinger | B60P 1/6418 180/11 |
| 3,631,999 A | * | 1/1972 | Walerowski | B65D 90/146 414/458 |

(Continued)

*Primary Examiner* — Jonathan Snelting
(74) *Attorney, Agent, or Firm* — John D. Tran; Rhema Law Group

(57) ABSTRACT

A container transport system and method of operation can include: providing a vehicle having a subframe assembly coupled thereto, the subframe assembly including a lifting arm and a clamping arm; clamping the clamping arm onto a corner fitting of a cargo container; raising the lifting arm for raising a portion of the cargo container; inserting a jack stand below the cargo container; lowering the lifting arm for tilting the cargo container on the jack stand, the jack stand configured as a fulcrum; positioning a container trailer below the cargo container; and raising the lifting arm for pivoting the cargo container on the jack stand and lowering the cargo container onto the container trailer.

13 Claims, 19 Drawing Sheets

(56) References Cited

U.S. PATENT DOCUMENTS

| | | | | |
|---|---|---|---|---|
| 3,795,336 A | * | 3/1974 | Acker | B60P 1/6445 |
| | | | | 414/458 |
| 4,452,555 A | * | 6/1984 | Calabro | B60P 1/6445 |
| | | | | 280/43.23 |
| 4,655,669 A | * | 4/1987 | Anttila | B65D 90/18 |
| | | | | 414/458 |
| 4,863,334 A | * | 9/1989 | Girerd | B64D 9/00 |
| | | | | 414/458 |
| 5,006,031 A | * | 4/1991 | Fossing | B60P 1/6445 |
| | | | | 414/458 |
| 5,326,214 A | * | 7/1994 | Swisher, Jr. | B60P 1/02 |
| | | | | 414/458 |
| 6,821,066 B2 | * | 11/2004 | Wehrli | B60P 3/40 |
| | | | | 410/32 |
| 8,226,124 B2 | * | 7/2012 | Anderson | B60P 3/2205 |
| | | | | 280/837 |
| 9,260,142 B2 | | 2/2016 | Marcantonio | |
| 9,511,702 B2 | * | 12/2016 | Ross | B60P 3/40 |

* cited by examiner

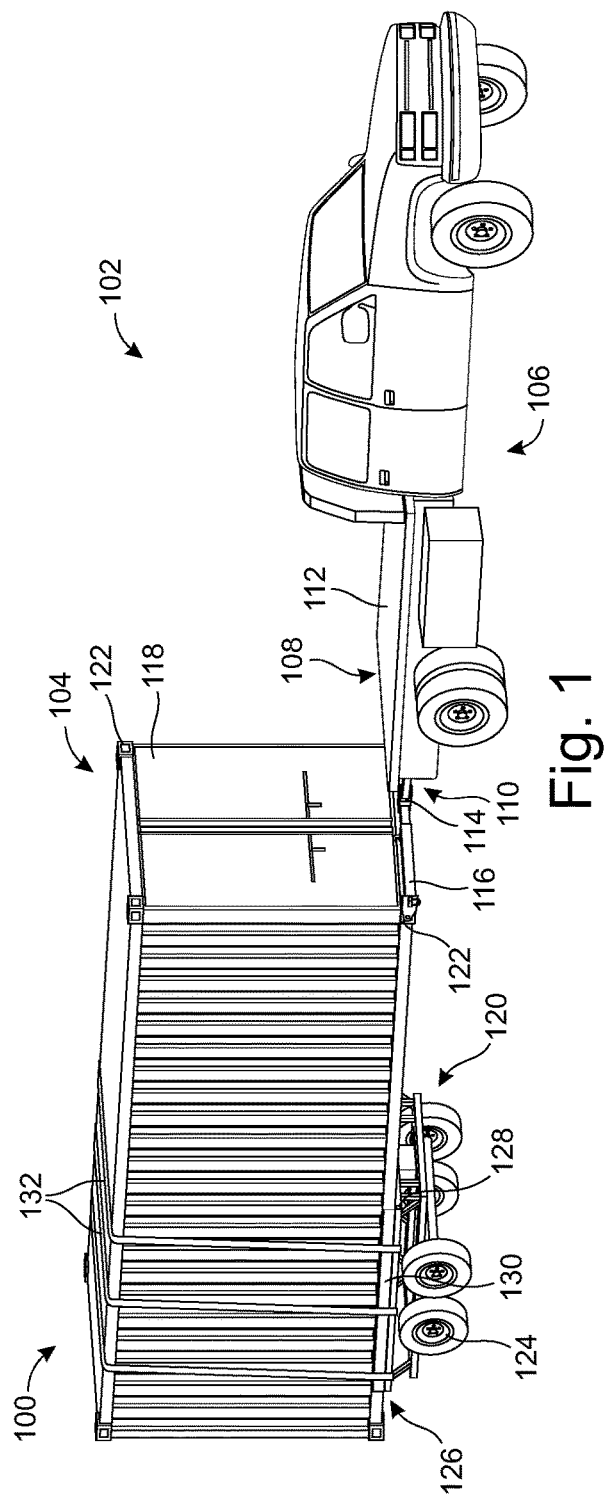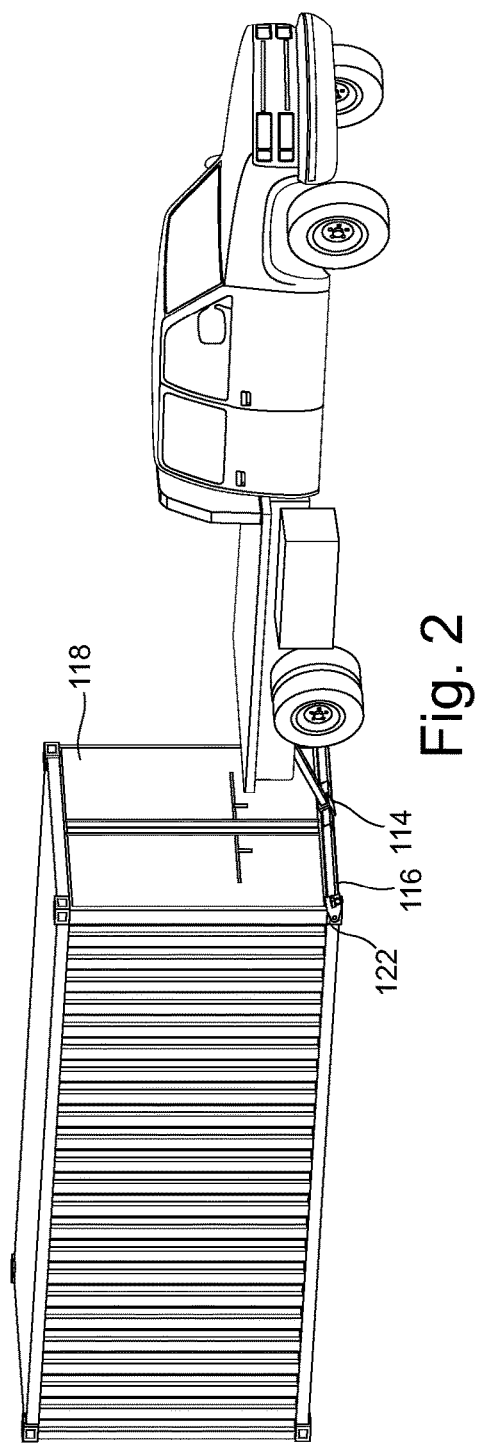

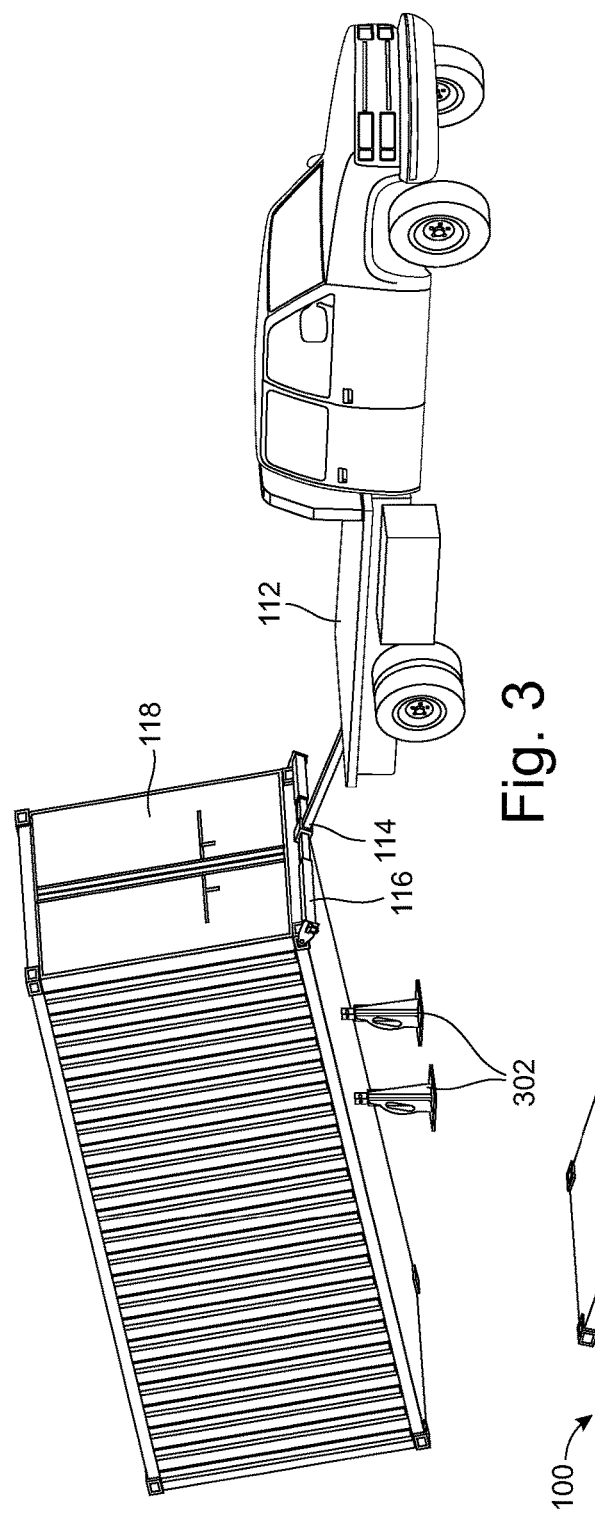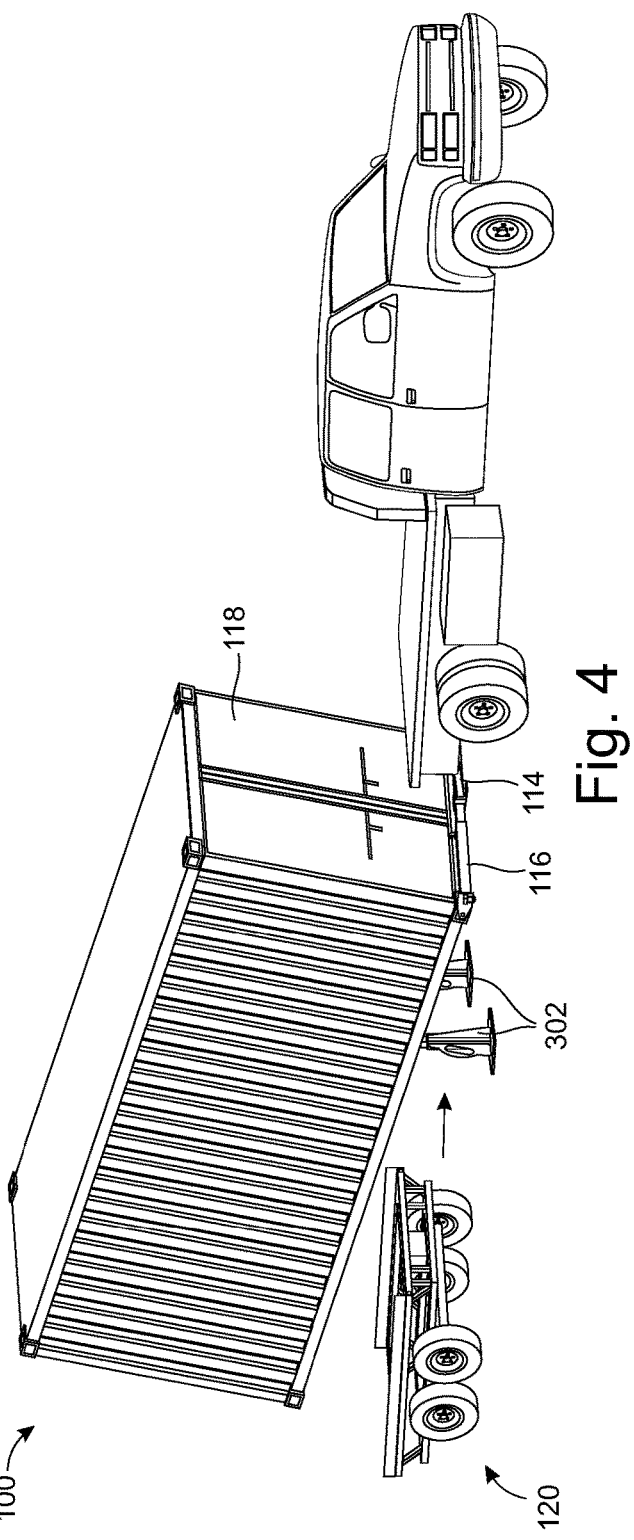

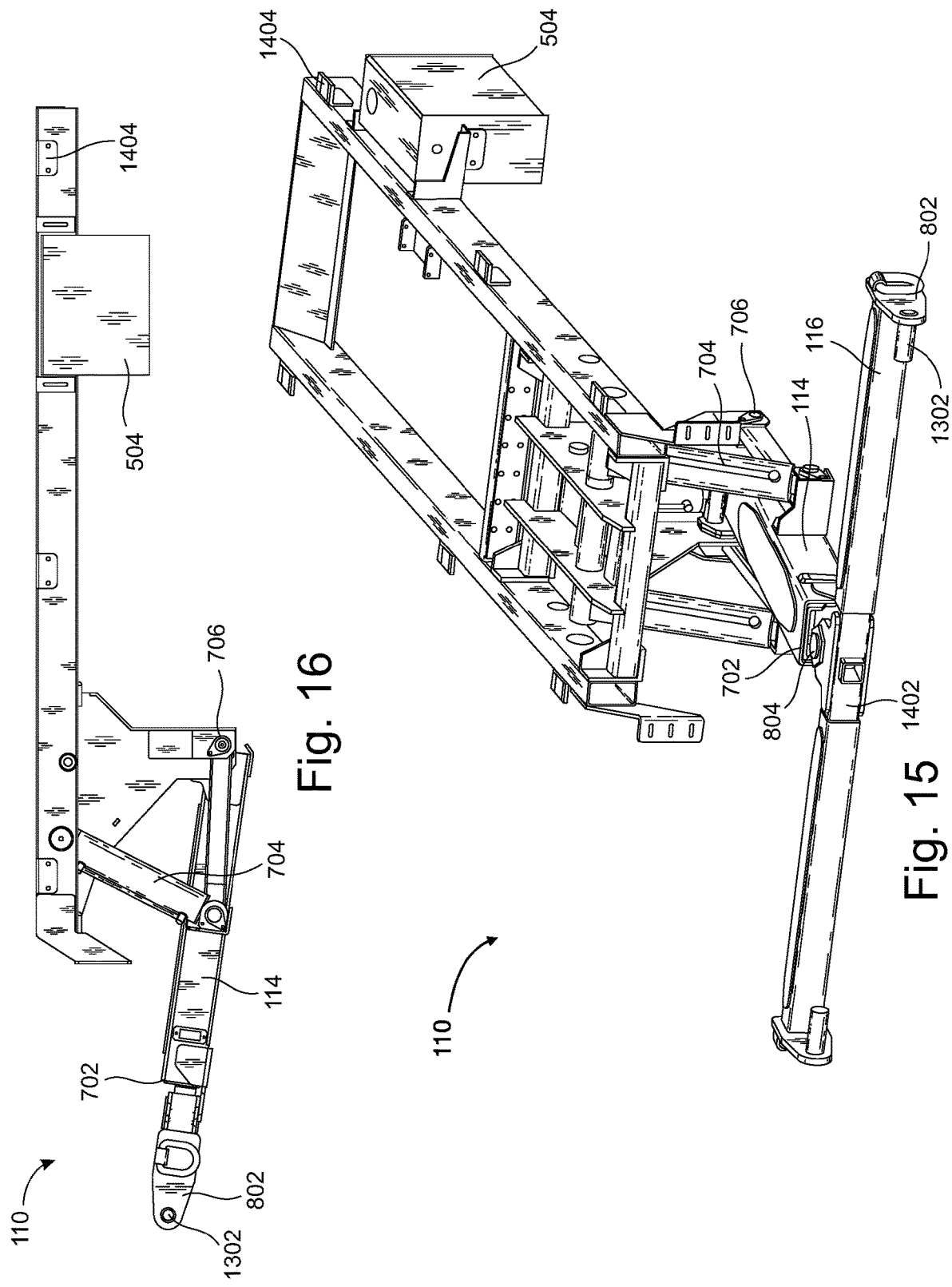

CONTAINER TRANSPORT SYSTEM

CROSS-REFERENCE TO RELATED APPLICATIONS

This claims priority benefit to all common subject matter of U.S. Provisional Patent Application 62/678,712 filed May 31, 2018. The content of this application is incorporated herein by reference in its entirety.

TECHNICAL FIELD

This disclosure relates to container transportation, more particularly to container loading, moving, and unloading.

BACKGROUND

The use of standardized shipping containers for the transportation of goods has greatly reduced the expense of international trade while simultaneously increasing its speed. This is especially evident in consumer goods and commodities.

Shipping container technologies and standards have dramatically changed how goods are transported overland, and especially on road. ISO shipping container standards has required special purpose transportation modifications directed to the special needs of the container transporting industry.

In particular, the shipping industry has unique attributes resulting in significant impacts on the development of freight moving technologies, in that they must be highly robust, safe, easy to maneuver, and cost effective. Cost effectiveness can include elements including insurance costs for large freight capable trucks, to fuel costs, to tire costs, and even to crew and operator costs.

Industry roadmaps have identified significant gaps between the current shipping container transportation technologies and demand for lower cost and more highly maneuverable systems. Current transportation systems are large and expensive.

Illustratively, for example, one form of transporting a shipping container includes the use of a tilting bed truck, which can be lowered to the ground and the shipping container winched up the tilted bed. As will be appreciated, the tilting bed can be expensive in that the bed must be generally as long as the shipping container and must be made to move over the full length.

A flatbed can be used as a less expensive alternative to the tilt bed; however, a crane or forklift would be required to secure the shipping container to the flatbed. This additional equipment increases costs of the equipment itself and also the crews and insurance required to operate them.

Further, a side loader trucks have been developed to transport shipping containers. Side loader trucks, however, require more room for access to the cargo container and additional costs to design and manufacture a mobile structure capable of lifting the container.

Crane trucks are yet another method of moving shipping containers. Crane trucks can be helpful when difficult placement or tight spots exist. However, and similar to the side loader trucks, designing and manufacturing a mobile truck mounted crane is high, as are the training requirements and operator costs for such specialized machines.

These prior developments may be suitable for the specific individual purposes to which they address, they would not be suitable for future shipping container transport when costs, maneuverability, and ease of use are demanded by the shipping industry.

Solutions have been long sought but prior developments have not taught or suggested any complete solutions, and solutions to these problems have long eluded those skilled in the art. Thus, there remains a considerable need for transportation systems that can greatly decrease costs while increasing ease of use and maneuverability.

SUMMARY

A container transport system and methods, providing significantly decreased costs while providing increased ease of use and maneuverability, are disclosed. The transport system and methods can include: providing a vehicle having a subframe assembly coupled thereto, the subframe assembly including a lifting arm and a clamping arm; clamping the clamping arm onto a corner fitting of a cargo container; raising the lifting arm for raising a portion of the cargo container; inserting a jack stand below the cargo container; lowering the lifting arm for tilting the cargo container on the jack stand, the jack stand configured as a fulcrum; positioning a container trailer below the cargo container; and raising the lifting arm for pivoting the cargo container on the jack stand and lowering the cargo container onto the container trailer.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The transport system is illustrated in the figures of the accompanying drawings which are meant to be exemplary and not limiting, in which like reference numerals are intended to refer to like components, and in which:

FIG. 1 is an isometric view of the transport system in a loaded phase of operation.

FIG. 2 is an isometric view of the transport system in an attachment step during a loading phase of operation.

FIG. 3 is an isometric view of the transport system in a lifting step during the loading phase of operation of FIG. 2.

FIG. 4 is an isometric view of the transport system in a positioning step during the loading phase of operation of FIG. 2.

FIG. 15 is a rear left side isometric view of the subframe assembly of FIG. 1.

FIG. 16 is a right side view of the subframe assembly of FIG. 1.

DETAILED DESCRIPTION

Figure 5:
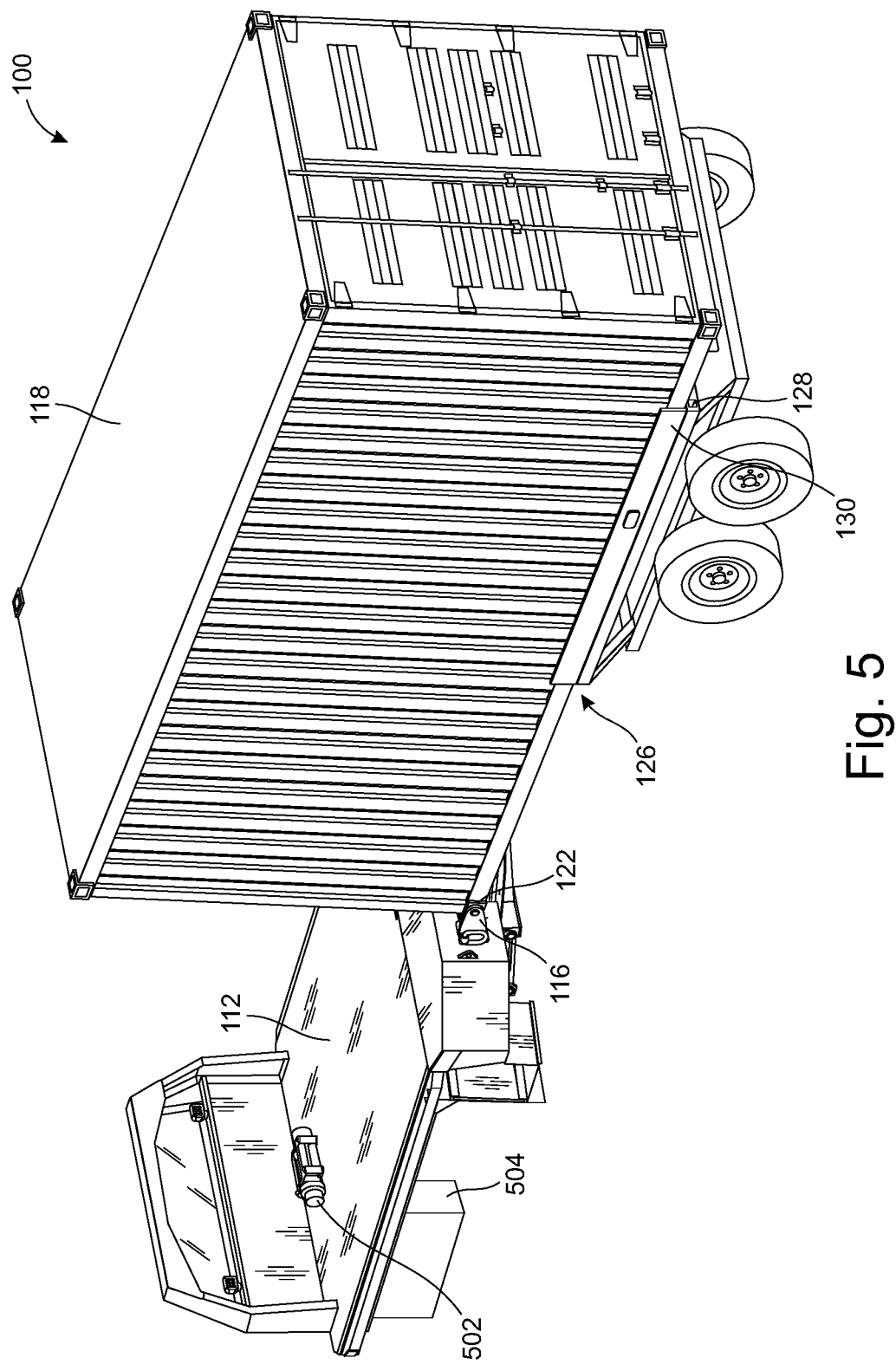
FIG. 5 is a rear isometric view of the transport system of FIG. 1.

In the following description, reference is made to the accompanying drawings that form a part hereof, and in which are shown by way of illustration, embodiments in which the transport system may be practiced. It is to be understood that other embodiments may be utilized and structural changes may be made without departing from the scope of the transport system.

When features, aspects, or embodiments of the transport system are described in terms of steps of a process, an operation, a control flow, or a flow chart, it is to be understood that the steps can be combined, performed in a different order, deleted, or include additional steps without departing from the transport system as described herein.

The transport system is described in sufficient detail to enable those skilled in the art to make and use the transport system and provide numerous specific details to give a thorough understanding of the transport system; however, it will be apparent that the transport system may be practiced without these specific details.

In order to avoid obscuring the transport system, some well-known system configurations and descriptions are not disclosed in detail. Likewise, the drawings showing embodiments of the system are semi-diagrammatic and not to scale and, particularly, some of the dimensions are for the clarity of presentation and are shown greatly exaggerated in the drawing FIGs.

As used herein, the term system is defined as a device or method depending on the context in which it is used. For expository purposes, the term "horizontal" as used herein is defined as a plane parallel to the top plane or surface of the flatbed, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane.

Referring now to FIG. 1, therein is shown an isometric view of the transport system 100 in a loaded phase of operation. The transport system 100 is depicted including a vehicle 102 coupled to a trailer 104.

The vehicle 102 is depicted as a truck 106 having a container lift 108. It is alternatively contemplated that other vehicles could be used in place of the truck 106 without departing from the transport system 100 as disclosed and claimed herein.

It will be appreciated by those of ordinary skill in the art that the container lift 108 can be affixed to the truck 106 or can alternatively be attached to other vehicles 102. The container lift 108 can include a subframe assembly 110 coupled to a truck bed 112.

It has been discovered that the truck bed 112 can provide adequate rigidity, space, and access to affix the subframe assembly 110 thereto. Further, it is contemplated that the truck bed 112 can be a flatbed as is depicted. However, it is contemplated that the subframe assembly 110 could be alternatively affixed to the underside of another bed configuration.

The subframe assembly 110 can include a lifting arm 114 coupled to two clamping arms 116. The clamping arms 116 can extend laterally away from the lifting arm 114 and can couple the vehicle 102 to the trailer 104.

The trailer 104 can include a cargo container 118 affixed to a container trailer 120. The clamping arms 116 of the subframe assembly 110 can be in direct contact with corner fittings 122 of the cargo container 118. The corner fittings 122 can be corner castings or corner fittings at each corner of the cargo container 118.

The corner fittings 122 can be ISO compliant. That is the corner fitting 122 can comply with ISO 1161, which establishes the basic dimensions and the functional and strength requirements of corner and intermediate fittings for cargo containers.

The container trailer 120 can include wheels 124 and container rails 126 on each side of the container trailer 120. The container rails 126 can be positioned above the wheels 124 and align lengthwise with the cargo container 118.

The container rails 126 can include both horizontal rails 128 as well as vertical rails 130. The horizontal rails 128 can provide support to the cargo container 118 from underneath the cargo container 118 while the vertical rails 130 can provide lateral support to the sides of the cargo container 118.

The container trailer 120 can be affixed to the cargo container 118 with the weight of the cargo container 118 providing a friction mount between the container trailer 120 and the cargo container 118. The container trailer 120 can further be affixed to the cargo container 118 with cargo straps 132.

The cargo straps 132 can extend from one side of the container trailer 120 up over the cargo container 118 to secure to the other side of the container trailer 120.

Referring now to FIG. 2, therein is shown an isometric view of the transport system 100 in an attachment step during a loading phase of operation. During the attachment step, the lifting arm 114 is lowered so that the clamping arms 116 contact the corner fittings 122 of the cargo container 118.

The lifting arm 114 can also be collapsible and extendable. That is the subframe assembly 110 of FIG. 1 can be extended rearward and down toward the ground during the attachment step.

Referring now to FIG. 3, therein is shown an isometric view of the transport system 100 in a lifting step during the loading phase of operation of FIG. 2. During the lifting step, the cargo container 118 can be lifted up and tilted using the lifting arm 114.

During the lifting step, jack stands 302 can be inserted below the cargo container 118. The cargo container 118 can be hinged up from a back portion of the cargo container 118 sitting on the ground toward a front portion of the cargo container 118 contacting the clamping arms 116 and lifted above the level of the truck bed 112.

It will be appreciated by those of ordinary skill in the art that typical independent tow truck arms can be tilted from the ground up to the height of the truck bed; however, the lifting arm 114 of the transport system 100 is shown to lift the clamping arm 116 together with the cargo container 118 up above the truck bed 112 nearly to the same vertical level as the mirrors or windows of the truck 106. The ability to lift the cargo container 118 in this manner has been discovered to be important to loading the cargo container 118 in tight spaces.

Importantly, the lifting arm 114 is shown to provide this extended vertical height as an independent lifting arm 114 rather than an integrated lifting arm. As will be appreciated by those of ordinary skill, integrated lifting arms include booms integrated with a truck bed while independent lifting arms are mounted to a frame below the truck bed.

Referring now to FIG. 4, therein is shown an isometric view of the transport system 100 in a positioning step during the loading phase of operation of FIG. 2. During the positioning step, the cargo container 118 can be tilted with the jack stands 302 acting as the fulcrum on which the cargo container 118 is tilting.

The cargo container 118 can be affixed to the lifting arm 114. The lifting arm 114 can be extended downward toward the ground lifting a back portion of the cargo container 118 up as the cargo container 118 pivots about the jack stands 302.

Further, during the positioning step, the container trailer 120 can be moved into position under the cargo container 118. Once the container trailer 120 is in position below the cargo container 118, the lifting arm 114 can be moved upward to the position shown in FIG. 1, the jack stands 302 can be removed and stored, and the cargo straps 132 of FIG. 1 can be affixed.

Referring now to FIG. 5, therein is shown a rear isometric view of the transport system 100 of FIG. 1. The clamping arms 116 are shown coupled and mated to the corner fitting 122 of the cargo container 118 and with the cargo container 118 being in the loaded position as shown in FIG. 1.

The truck bed 112 of the vehicle 102 of FIG. 1 is shown having a winch 502 as well as a utility box 504. The container rails 126 are depicted with the vertical rail 130 in contact with a vertical side of the cargo container 118 while the horizontal rail 128 is depicted in contact with a horizontal side of the cargo container 118.

Figure 6:
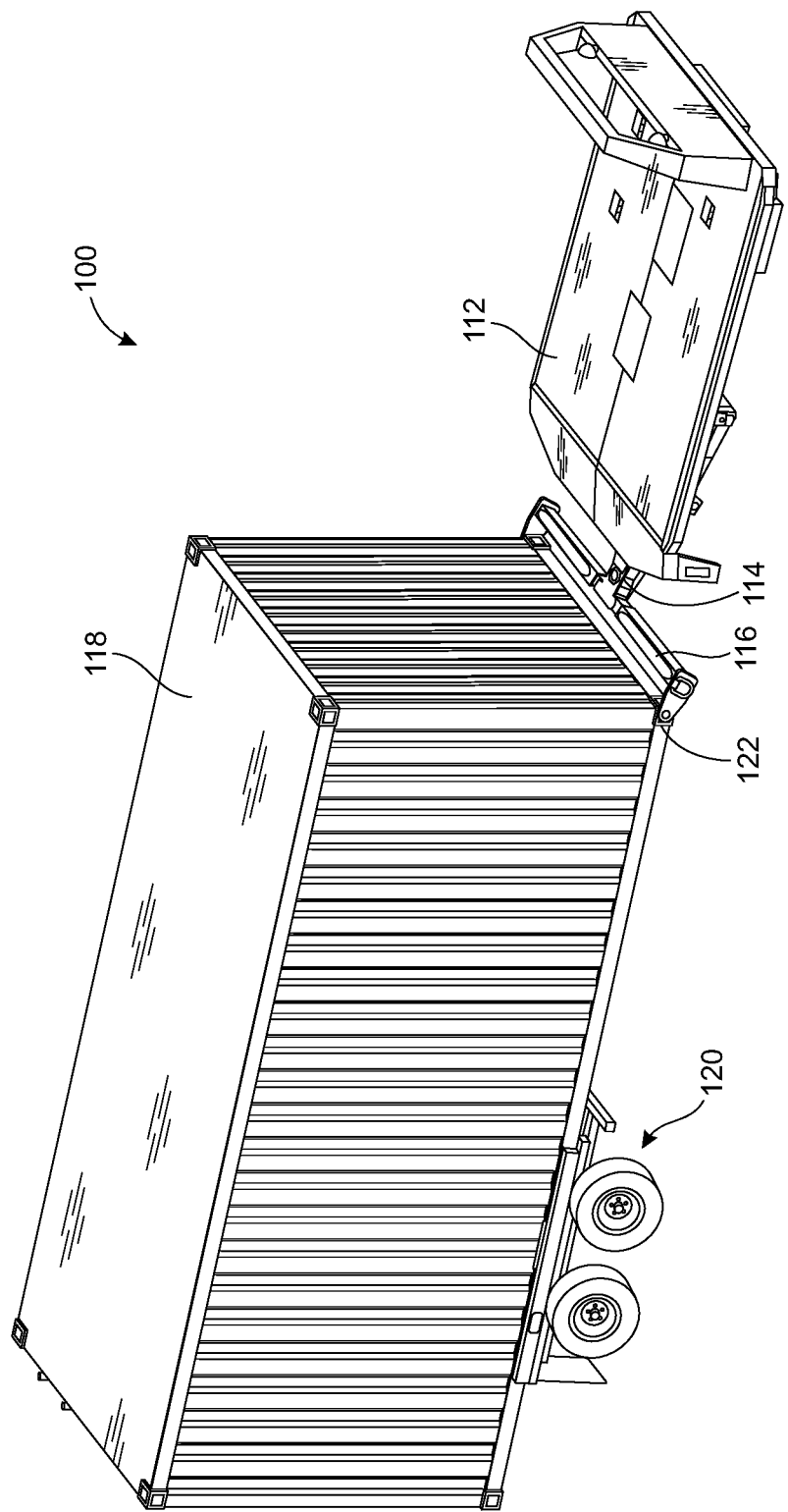
FIG. 6 is a right top isometric view of the transport system of FIG. 1.

Referring now to FIG. 6, therein is shown a right top isometric view of the transport system 100 of FIG. 1. The lifting arm 114 is depicted extending underneath the truck bed 112.

The clamping arms 116 are shown extending out laterally away from the lifting arm 114 to contact the corner fittings 122 of the cargo container 118. The container trailer 120 is depicted underneath the cargo container 118.

Figure 7:
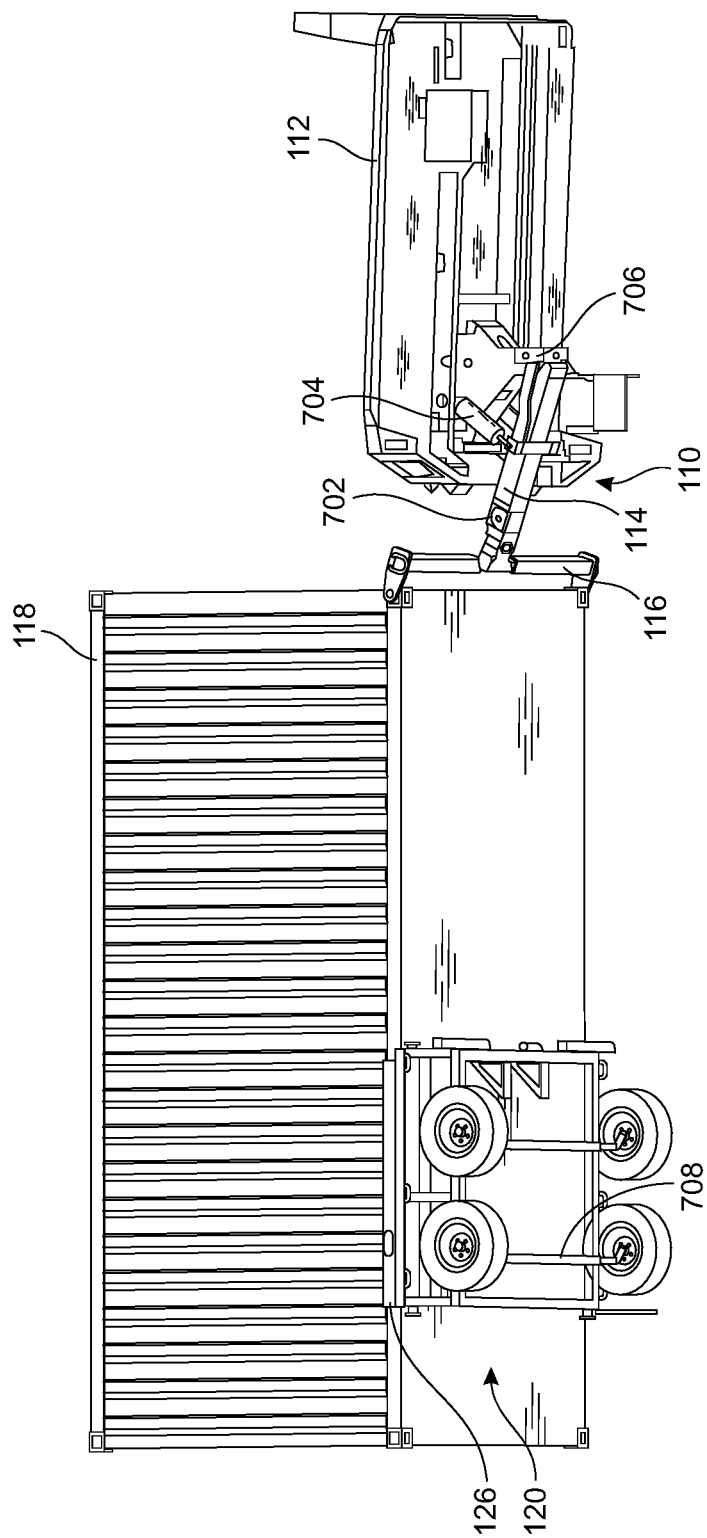
FIG. 7 is a right bottom isometric view of the transport system of FIG. 1.

Referring now to FIG. 7, therein is shown a right bottom isometric view of the transport system 100 of FIG. 1. The subframe assembly 110 is shown affixed to the truck bed 112 and extended across the underside of the truck bed 112.

The subframe assembly 110 can include the lifting arm 114 which can include a collapsing extension 702 for laterally positioning the clamping arms 116 coupled to the lifting arm 114 closer or further from the truck bed 112. The subframe assembly 110 can further include cylinders 704 coupled between the subframe assembly 110 and the lifting arm 114.

The cylinders 704 can be pneumatic cylinders or hydraulic cylinders for actuating the lifting arm 114 up and down relative to the subframe assembly 110 and the truck bed 112. The lifting arm 114 can be coupled to the subframe assembly 110 with an attachment point 706.

The attachment point 706 can be a fulcrum on which the lifting arm 114 pivots vertically based on the extension or retraction of the cylinder 704. As will be appreciated, the lifting arm 114 can be rotationally coupled to the clamping arms 116.

The container trailer 120 is depicted having cross-bars 708 extending laterally underneath the cargo container 118. The container rails 126 are depicted in direct contact with the cargo container 118.

Figure 8:
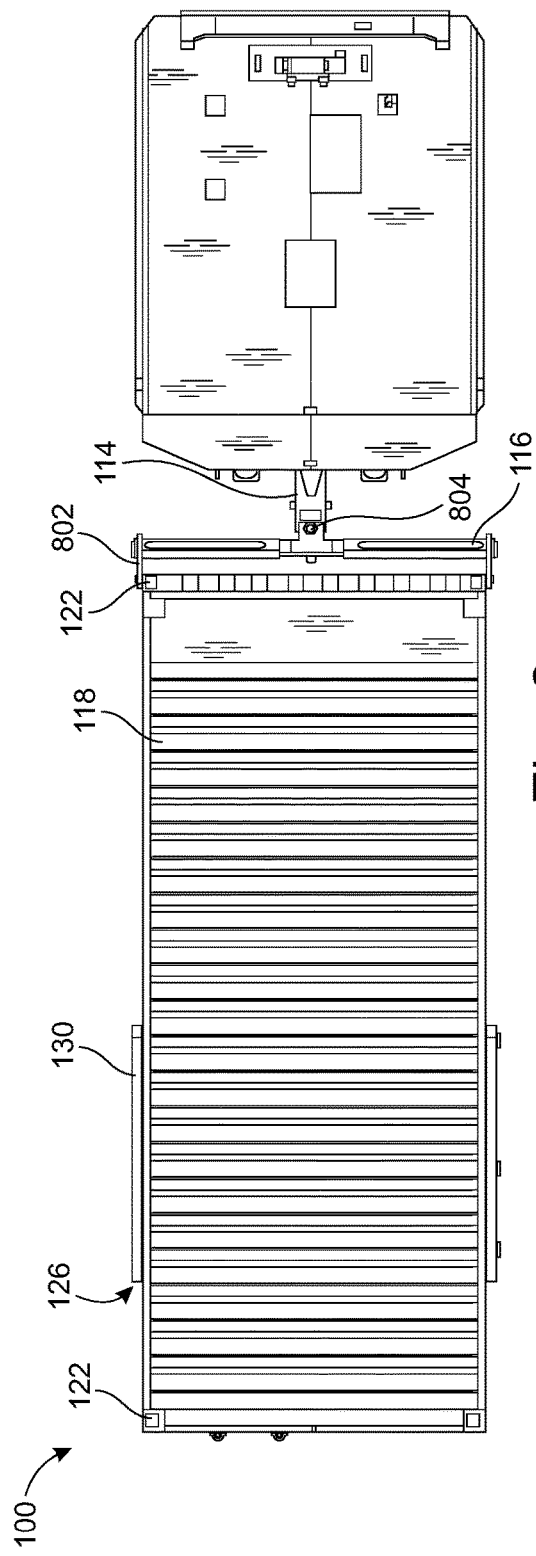
FIG. 8 is a top side view of the transport system of FIG. 1.

Referring now to FIG. 8, therein is shown a top side view of the transport system 100 of FIG. 1. The vertical rails 130 of the container rails 126 is depicted extended laterally beyond the vertical sides of the cargo container 118 as are clamping portions 802 of the clamping arms 116.

The clamping portions 802 can extend perpendicularly away from the clamping arms 116 toward the cargo container 118. The clamping portions 802 can directly couple to and make contact with the corner fitting 122 of the cargo container 118.

The lifting arm 114 is shown coupled to the clamping arms 116 with a rotational coupling 804. Thus, it will be appreciated that the cargo container 118 can pivot vertically on the clamping portions 802 of the clamping arms 116 and can pivot rotationally and horizontally about the rotational coupling between the lifting arm 114 and the clamping arms 116.

Figure 9:
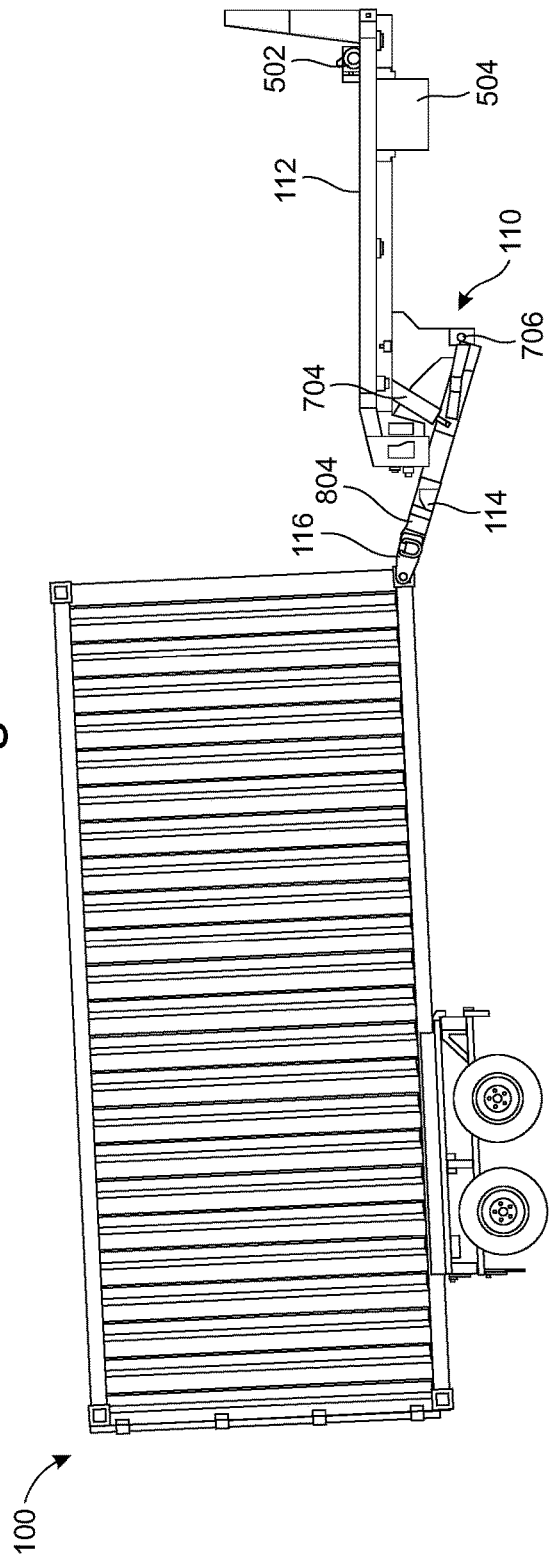
FIG. 9 is a right side view of the transport system of FIG. 1.

Referring now to FIG. 9, therein is shown a right side view of the transport system 100 of FIG. 1. The subframe assembly 110 is shown affixed below the truck bed 112.

The subframe assembly 110 is shown having the lifting arm 114 coupled to the subframe assembly 110 with the attachment point 706. The lifting arm 114 is further shown to be coupled to the cylinder 704.

The cylinder 704 can be coupled to the subframe assembly 110 between the attachment point 706 and the rotational coupling 804 between the lifting arm 114 and the clamping arms 116. The truck bed 112 can be shown fitted with the utility box 504 and winch 502.

Figure 10:
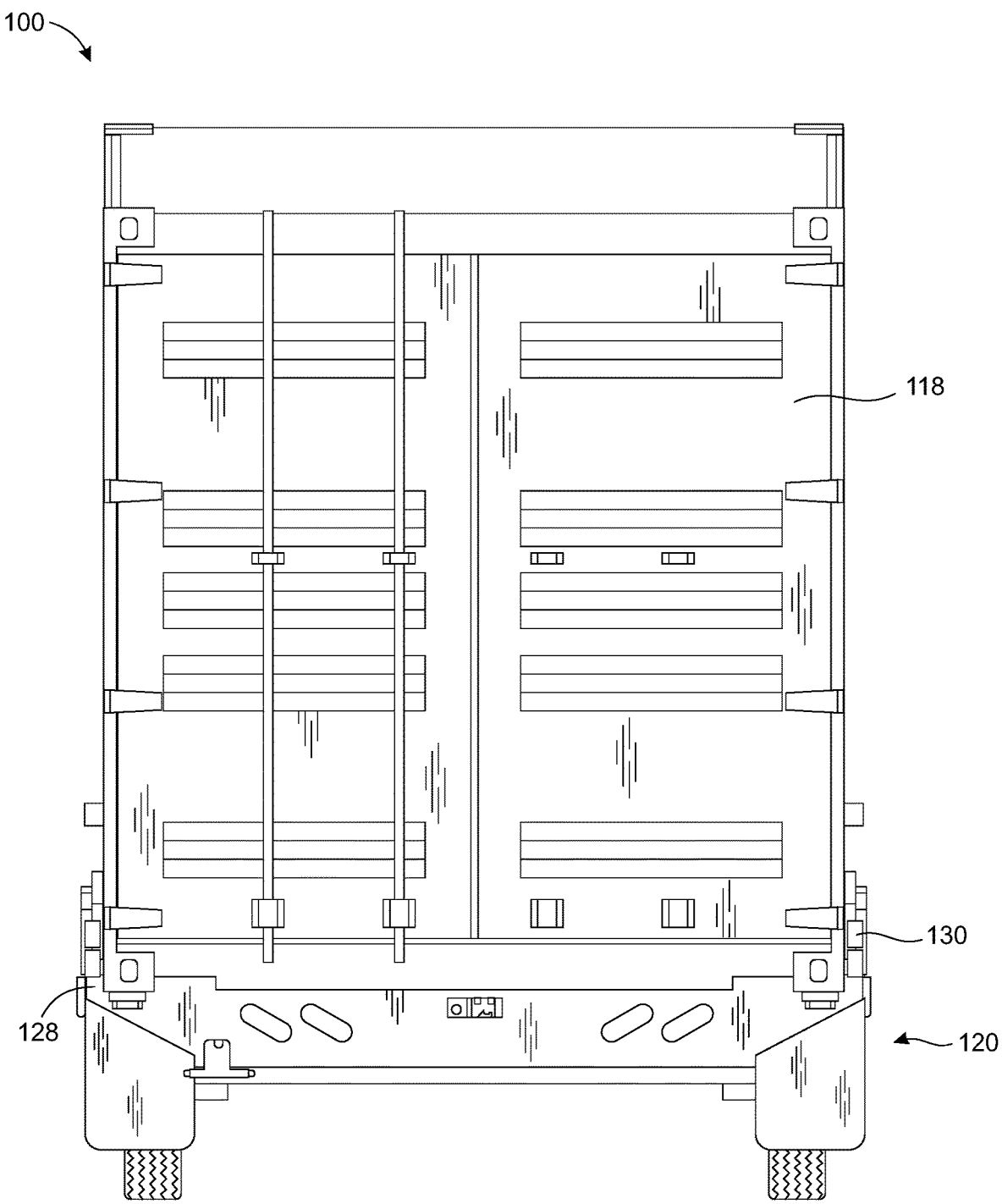
FIG. 10 is a back side view of the transport system of FIG. 1.

Referring now to FIG. 10, therein is shown a back side view of the transport system 100 of FIG. 1. The cargo container 118 is shown having the container trailer 120 affixed thereunder.

The vertical rails 130 of the container trailer 120 are shown alternatively spaced apart from vertical sides of the cargo container 118. The horizontal rails 128 of the container trailer 120 can be in direct contact with the bottom of the cargo container 118.

Figure 11:
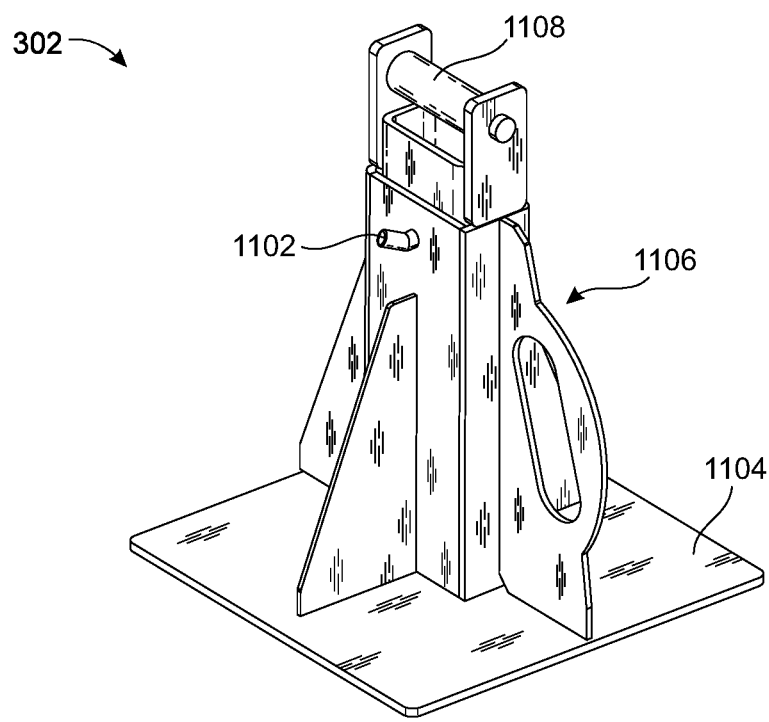
FIG. 11 is an isometric view of the jack stand of FIG. 3.

Referring now to FIG. 11, therein is shown an isometric view of the jack stand 302 of FIG. 3. The jack stand 302 can be vertically adjustable using a vertical adjustment pin 1102. The jack stands 302 can further include a base 1104 and a vertical extension 1106 terminating in a rotatable contact 1108.

The top portion including the rotatable contact 1108 can be raised and lowered vertically. When a vertical position is desired the vertical adjustment pin 1102 can be used to lock the top of the jack stand 302 at a desired height.

The rotatable contact 1108 can enable a user to reposition the cargo container 118 on the jack stand when balancing on the jack stand. That is, the cargo container 118 can be moved laterally on the rotatable contacts 1108.

The jack stands 302 can be stored in the utility box 504 of FIG. 5 either on the subframe assembly 110 of FIG. 1, the truck bed 112 of FIG. 1, or the container trailer 120 of FIG. 1.

Figure 12:
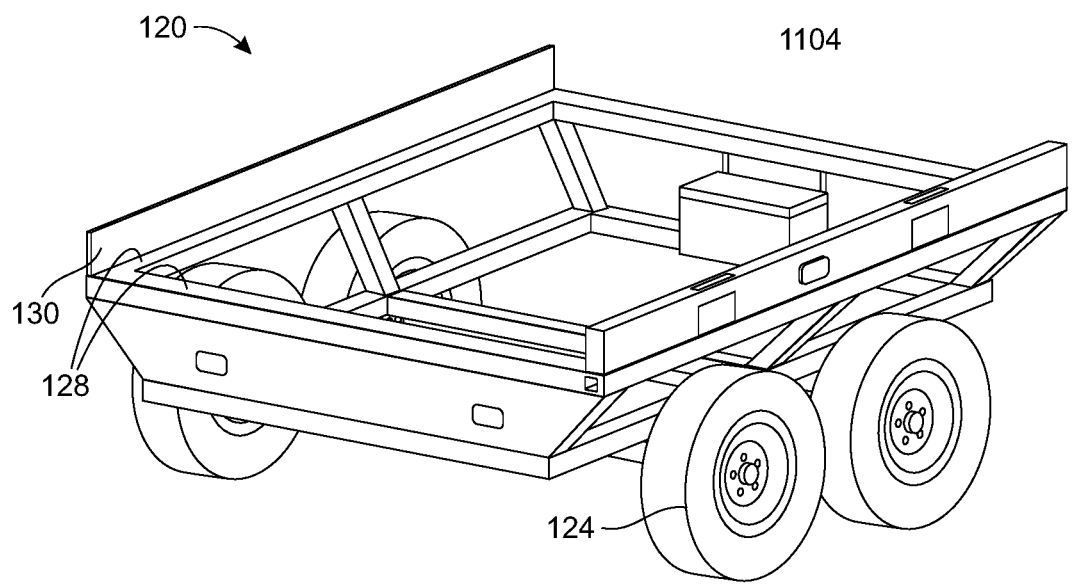
FIG. 12 is a back right isometric view of the container trailer of FIG. 1.

Referring now to FIG. 12, therein is shown a back right isometric view of the container trailer 120 of FIG. 1. The container trailer 120 is shown having the vertical rails 130 extending up vertically from the horizontal rails 128, both of which are depicted above the wheels 124.

The vertical rails 130 can extend along two sides of the container trailer 120 while the horizontal rails 128 can be formed as a square to support the cargo container 118 of FIG. 1 from multiple contact points. Illustratively, the horizontal rails 128 can be formed as a square and can further include additional cross bars forming horizontal rails 128.

Figure 13:
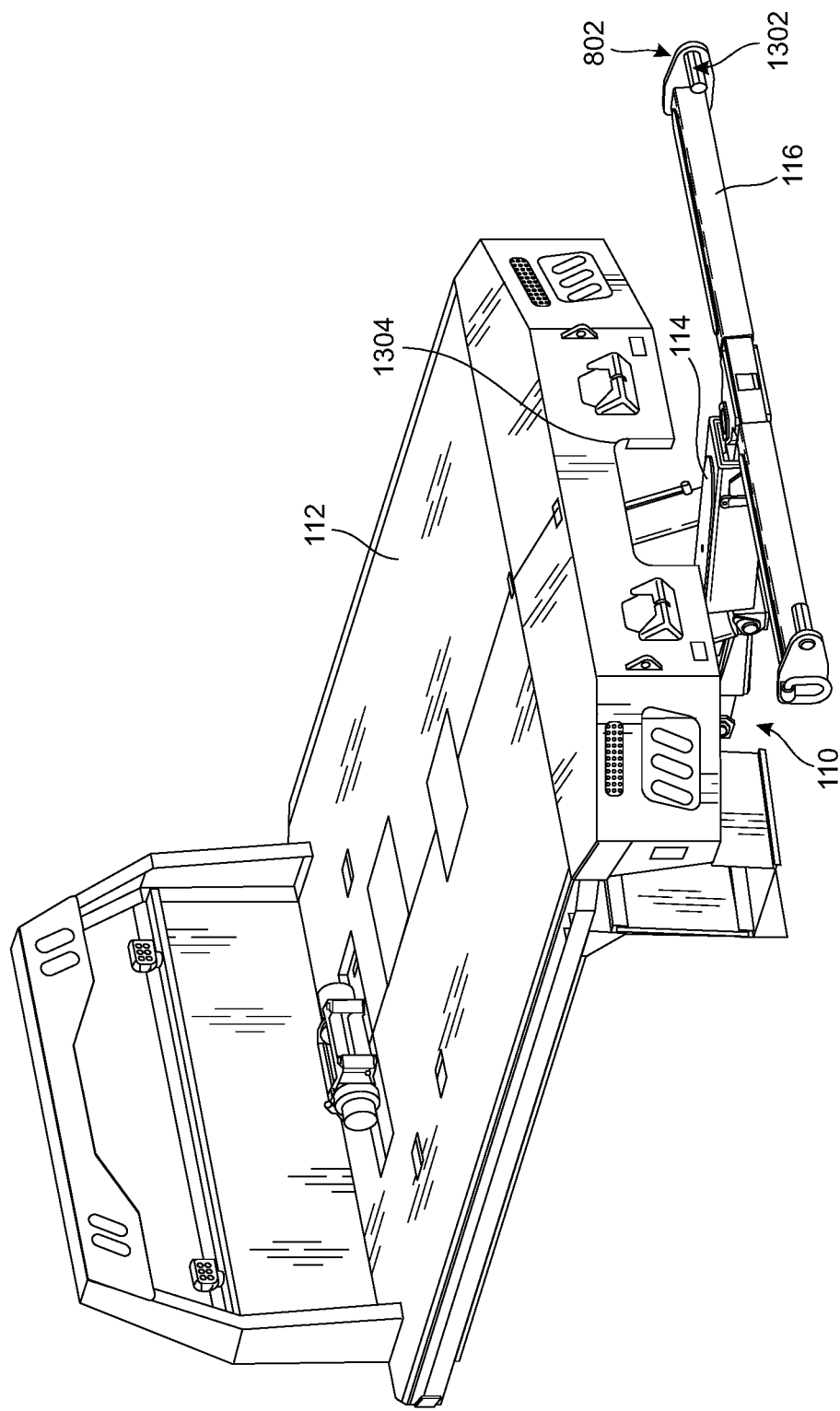
FIG. 13 is a back left isometric view of the truck bed of FIG. 1.

Referring now to FIG. 13, therein is shown a back left isometric view of the truck bed 112 of FIG. 1. The truck bed 112 is depicted with the subframe assembly 110 mounted thereto. The subframe assembly 110 is shown having the lifting arm 114 coupled to the clamping arms 116 extended from under the truck bed 112.

The clamping arms 116 are shown having the clamping portions 802 extended perpendicularly therefrom. The clamping portions 802 can include an extended connection 1302.

The extended connections 1302 can extend back inward toward the lifting arm 114. The extended connections 1302 can mate to female portions of the corner fitting 122 of FIG. 1 of the cargo container 118 of FIG. 1.

As will be appreciated the lifting arm 114 can extend past the end of the truck bed 112. The truck bed 112 can further include a cut out 1304 for ensuring the lifting arm 114 has adequate clearance and space for articulating vertically with respect to the truck bed 112.

Figure 14:
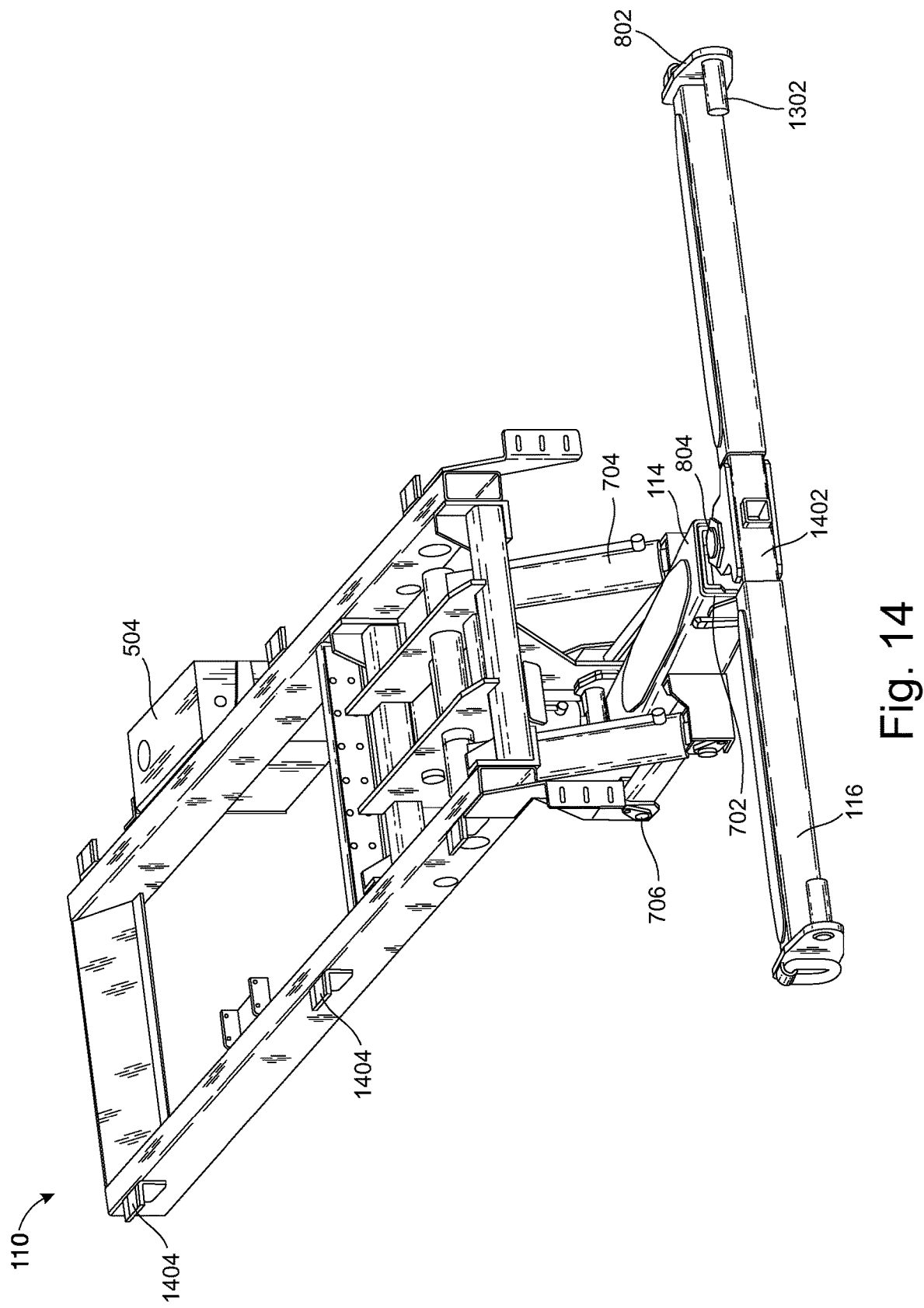
FIG. 14 is a rear right side isometric view of the subframe assembly of FIG. 1.

Referring now to FIG. 14, therein is shown a rear right side isometric view of the subframe assembly 110 of FIG. 1. The subframe assembly 110 is shown having the lifting arm 114 coupled to the subframe assembly 110 with the attachment point 706.

The lifting arm 114 can be raised and lowered based on the extension or retraction of the cylinders 704 mounted to either side of the lifting arm 114. The cylinders 704 can be affixed to the subframe assembly 110 and to the lifting arm 114 with hinged attachments.

The lifting arm 114 can be further depicted including the collapsing extension 702 enabling the lifting arm 114 to extend out away from the subframe assembly 110 or back toward the subframe assembly 110. The lifting arm 114 is depicted as coupled to the clamping arms 116 with the rotational coupling 804.

The clamping arms 116 are shown extended laterally out away from the subframe assembly 110 and terminating in the clamping portions 802 having the extended connections 1302 for mating with the corner fitting 122 of FIG. 1 of the cargo container 118 of FIG. 1. It is contemplated that the clamping arms 116 can be mounted to a horizontal arm 1402.

The horizontal arm 1402 can be a structure that can fit within the clamping arms 116 and allow the clamping arms 116 to adjust or extend laterally along the horizontal arm 1402. Thus, the clamping portions 802 of the clamping arms 116 can be widened to fit around the cargo container 118 by sliding the clamping arms 116 along the horizontal arm 1402. Further, the clamping portions 802 can be clamped onto the corner fittings 122 of the cargo container 118 by sliding the clamping arms 116 together along the horizontal arm 1402.

The subframe assembly 110 can further include attachment mounts 1404 for attaching the subframe assembly 110 to the truck bed 112. Further, the subframe assembly 110 is shown having the utility box 504 affixed thereto.

Referring now to FIG. 15, therein is shown a rear left side isometric view of the subframe assembly 110 of FIG. 1. The subframe assembly 110 is shown having the lifting arm 114 coupled to the subframe assembly 110 with the attachment point 706.

The lifting arm 114 can be raised and lowered based on the extension or retraction of the cylinders 704 mounted to either side of the lifting arm 114. The cylinders 704 can be affixed to the subframe assembly 110 and to the lifting arm 114 with hinged attachments.

The lifting arm 114 can be further depicted including the collapsing extension 702 enabling the lifting arm 114 to extend out away from the subframe assembly 110 or back toward the subframe assembly 110. The lifting arm 114 is depicted as coupled to the clamping arms 116 with the rotational coupling 804.

The clamping arms 116 are shown extended laterally out away from the subframe assembly 110 and terminating in the clamping portions 802 having the extended connections 1302 for mating with the corner fitting 122 of FIG. 1 of the cargo container 118 of FIG. 1. It is contemplated that the clamping arms 116 can be mounted to the horizontal arm 1402.

The horizontal arm 1402 can be a structure that can fit within the clamping arms 116 and allow the clamping arms 116 to adjust or extend laterally along the horizontal arm 1402. Thus, the clamping portions 802 of the clamping arms 116 can be widened to fit around the cargo container 118 by sliding the clamping arms 116 out along the horizontal arm 1402. Further, the clamping portions 802 can be clamped onto the corner fittings 122 of the cargo container 118 by sliding the clamping arms 116 back together along the horizontal arm 1402.

The subframe assembly 110 is further depicted to include the attachment mounts 1404 for attaching the subframe assembly 110 to the truck bed 112. Further, the subframe assembly 110 is shown having the utility box 504 affixed thereto.

Referring now to FIG. 16, therein is shown a right side view of the subframe assembly 110 of FIG. 1. The subframe assembly 110 is shown having the lifting arm 114 coupled to the subframe assembly 110 with the attachment point 706.

The lifting arm 114 can be raised and lowered based on the extension or retraction of the cylinders 704 mounted to either side of the lifting arm 114. The cylinders 704 can be affixed to the subframe assembly 110 and to the lifting arm 114 with hinged attachments.

The lifting arm 114 can be further depicted including the collapsing extension 702 enabling the lifting arm 114 to extend out away from the subframe assembly 110 or back toward the subframe assembly 110. The lifting arm 114 can be coupled to the clamping arms 116 of FIG. 1 with the rotational coupling 804 of FIG. 8.

The clamping arms 116 can terminate in the clamping portions 802 having the extended connections 1302 for mating with the corner fitting 122 of FIG. 1 of the cargo container 118 of FIG. 1.

The subframe assembly 110 is further depicted to include the attachment mounts 1404 for attaching the subframe assembly 110 to the truck bed 112. Further, the subframe assembly 110 is shown having the utility box 504 affixed thereto.

Figure 17:
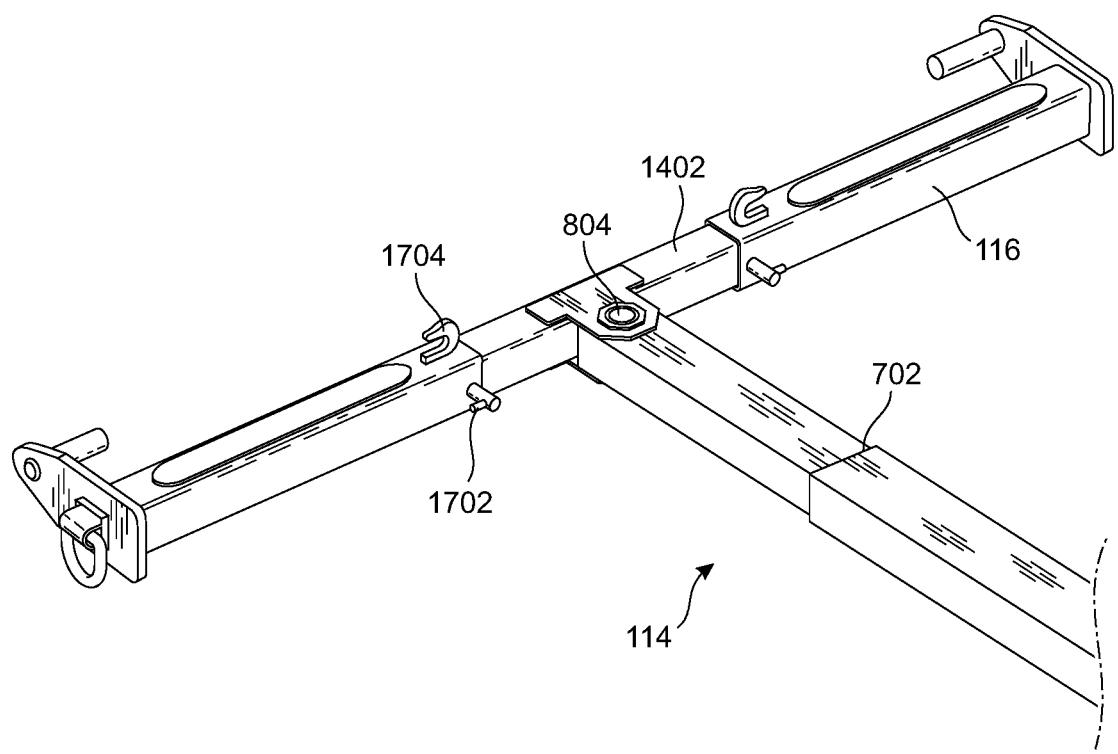
FIG. 17 is a front right isometric view of the lifting arm of FIG. 1.

Referring now to FIG. 17, therein is shown a front right isometric view of the lifting arm 114 of FIG. 1. The lifting arm 114 is depicted having the collapsing extension 702 for enabling a collapsible lifting arm.

The lifting arm 114 is depicted as coupled to the horizontal arm 1402 with the rotational coupling 804. The lifting arm 114 is further depicted as coupled to the clamping arms 116 with the rotational coupling 804 through the horizontal arm 1402. The clamping arms 116 can include adjustment lugs 1702 and tie downs 1704 for adjusting the clamping arms 116 wider and narrower by sliding them horizontally along the horizontal arm 1402.

Figure 18:
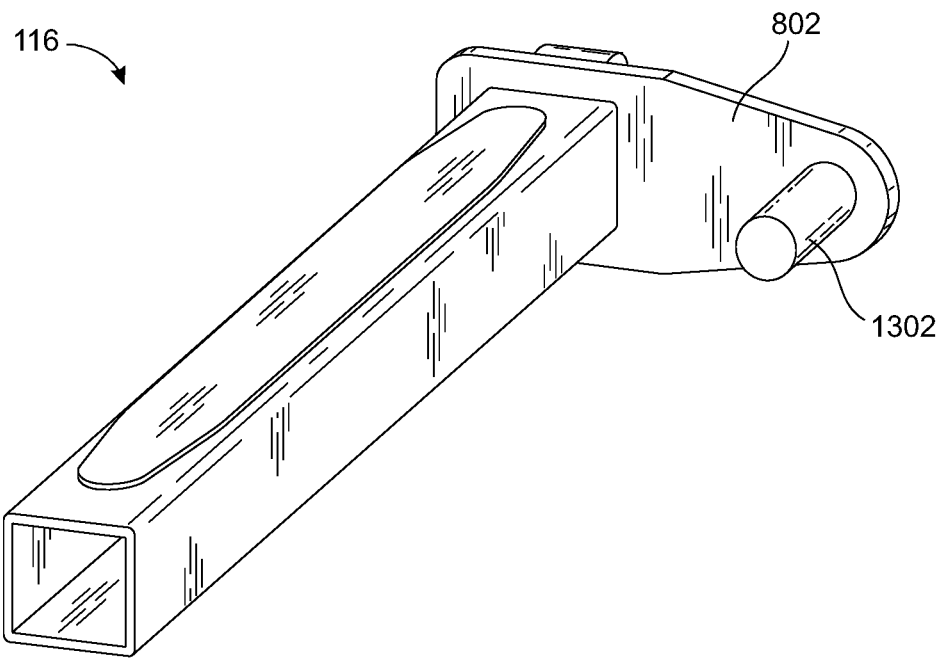
FIG. 18 is an inner isometric view of the clamping arm of FIG. 1.

Referring now to FIG. 18, therein is shown an inner isometric view of the clamping arm 116 of FIG. 1. The clamping arm 116 is hollow. It is contemplated that the clamping arm 116 can be mounted with the horizontal arm 1402 of FIG. 14 extending inside the hollow portion of the clamping arm 116. The clamping portion 802 is shown extended perpendicularly between both the clamping arm 116 and the extended connection 1302.

Figure 19:
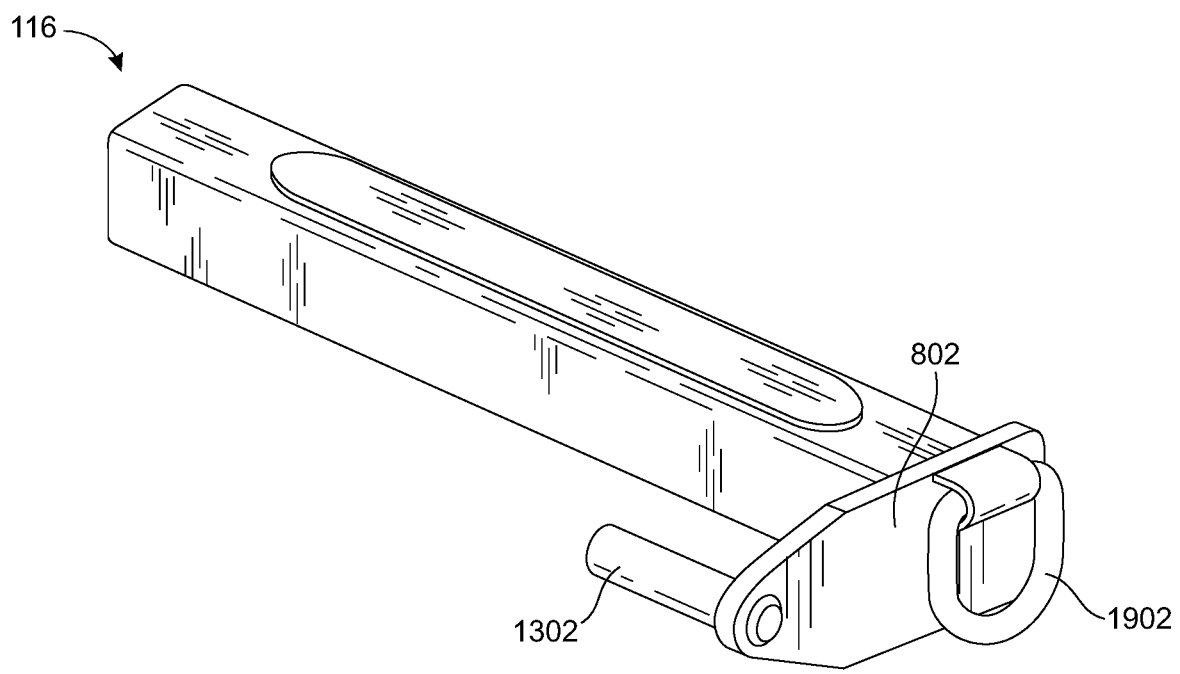
FIG. 19 is an outer isometric view of the clamping arm of FIG. 1.

Referring now to FIG. 19, therein is shown an outer isometric view of the clamping arm 116 of FIG. 1. The clamping arm 116 is hollow. It is contemplated that the clamping arm 116 can be mounted with the horizontal arm 1402 of FIG. 14 extending inside the hollow portion of the clamping arm 116.

The clamping portion 802 is shown extended perpendicularly between both the clamping arm 116 and the extended connection 1302. Additionally, D-rings 1902 are shown affixed to external portions of the clamping portion 802.

Figure 20:
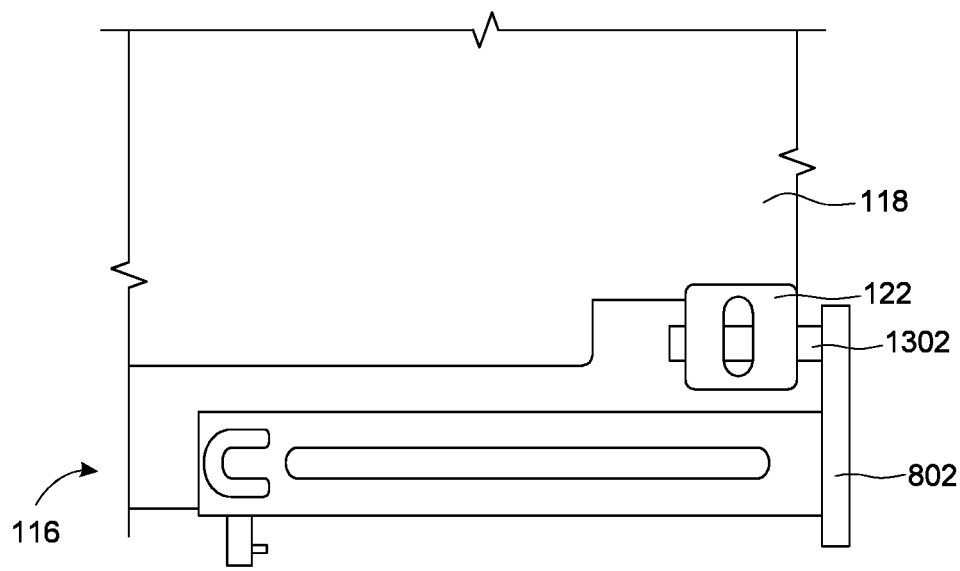
FIG. 20 is a front isometric view of the clamping arm of FIG. 1.

Referring now to FIG. 20, therein is shown a front isometric view of the clamping arms 116 of FIG. 1. The clamping arm 116 is shown having the extended connection 1302 of the clamping portion 802 extending completely through the corner fitting 122 of the cargo container 118.

It has been discovered that the coupling of the cargo container 118 to the clamping arm 116 with the extended connection 1302 completely extended through the corner fitting 122 of the cargo container 118 provides a robust coupling providing rotational stability for turning the cargo container 118. It has been further discovered that the coupling of the cargo container 118 to the clamping arm 116 with the extended connection 1302 completely extended through the corner fitting 122 of the cargo container 118 provides suspension for the front of the cargo container 118 by allowing the cargo container 118 to articulate on the extended connections 1302 while simultaneously directing lateral and vertical forces through the clamping arms 116, through the subframe assembly 110 of FIG. 1 and into the suspension of the truck 106 of FIG. 1.

Figure 22:
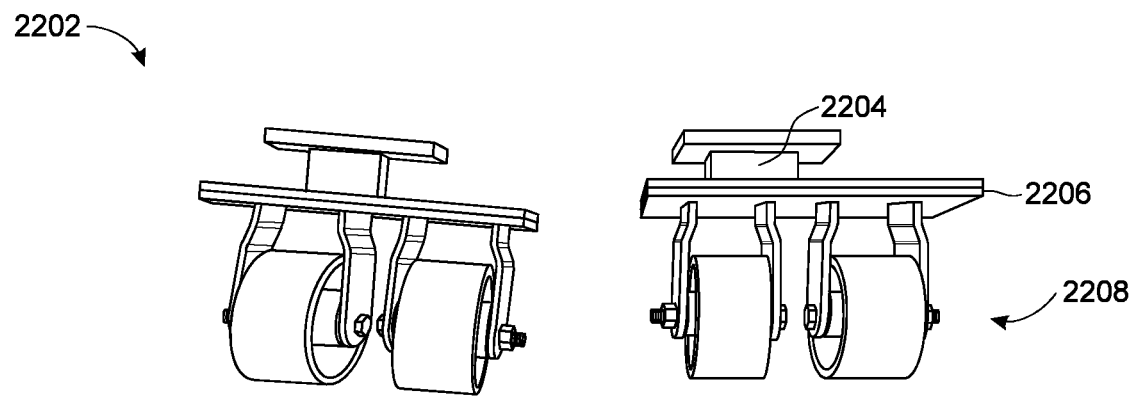
FIG. 22 is an isometric view of caster skates for the transport system.
Figure 24:
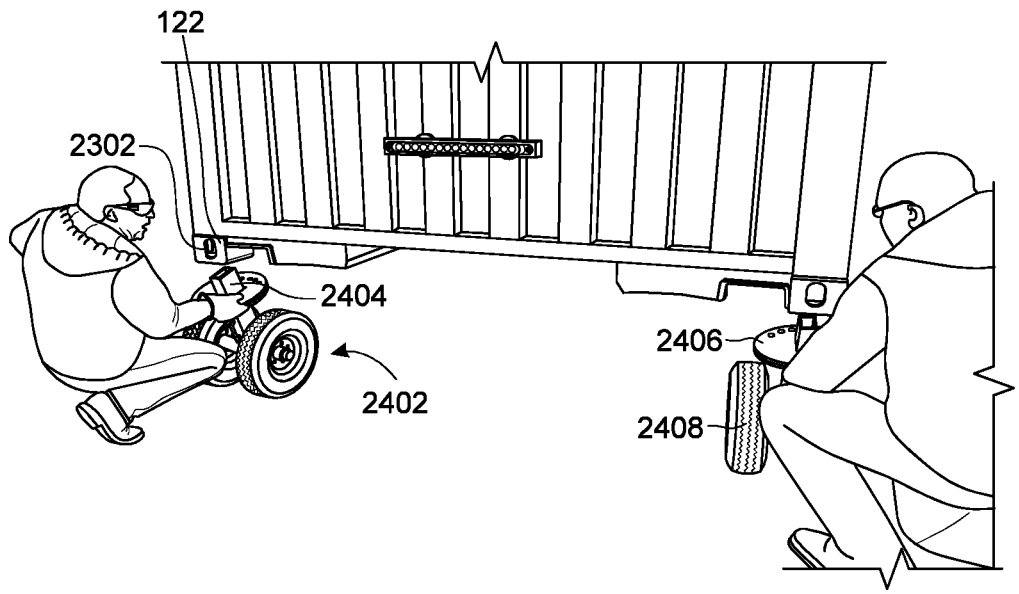
FIG. 24 is an isometric view of placement dollies in an attachment phase of operation.

Coupling the cargo container 118 to the clamping arm 116 with the extended connection 1302 completely extended through the corner fitting 122 of the cargo container 118 has been discovered to provide increased stability not only in the loaded phase of operation around town or at high way speeds, but also provides increased stability and controllability when maneuvering in tight places utilizing, for example, the caster skates 2202 of FIG. 22 or the placement dollies 2402 of FIG. 24.

Figure 21:
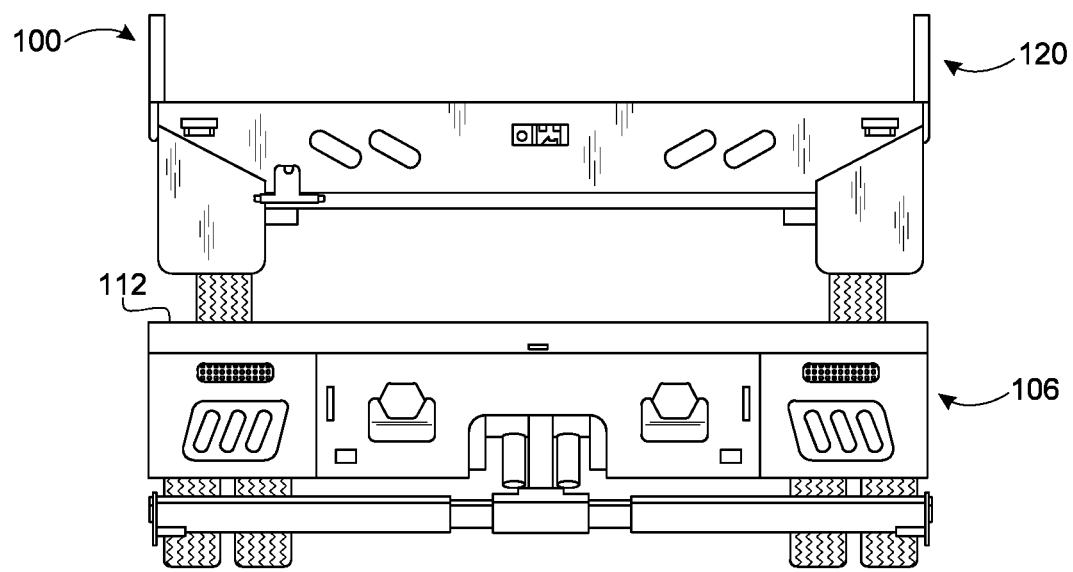
FIG. 21 is a back view of the transport system of FIG. 1 after a store phase of operation.

Referring now to FIG. 21, therein is shown a back view of the transport system 100 of FIG. 1 after a store phase of operation. The vehicle 102 of FIG. 1 is depicted having the container trailer 120 stored on the truck bed 112. It is contemplated that storing the container trailer 120 on the truck bed 112 can increase mobility of the transport system 100 when not towing the cargo container 118 of FIG. 1.

Further, by storing the container trailer 120 on the truck bed 112 of the vehicle 102, fuel efficiency can be increased. Alternatively, it is contemplated that the container trailer 120 can be towed when not in use to transport the cargo container 118.

Referring now to FIG. 22, therein is shown an isometric view of caster skates 2202 for the transport system 100. The caster skates 2202 are depicted each having a vertical lock 2204.

The vertical lock 2204 can be coupled to a base plate 2206. The base plate 2206 can be coupled to caster wheels 2208. The vertical lock 2204 can be inserted within holes of the corner fittings 122 of FIG. 1 and twisted to lock the caster skates 2202 into place relative to the corner fittings 122.

The base plate 2206 can be in direct contact with the corner fittings 122 and provide a stable mechanical connection between the corner fittings 122 of the cargo container 118 of FIG. 1 and the caster skates 2202. The caster skates 2202 can also be positioned on the cargo container 118 at an angle other than directly forward for allowing the cargo container 118 move at an angle differing from the angle of the pulling force placed on the cargo container 118.

Figure 23:
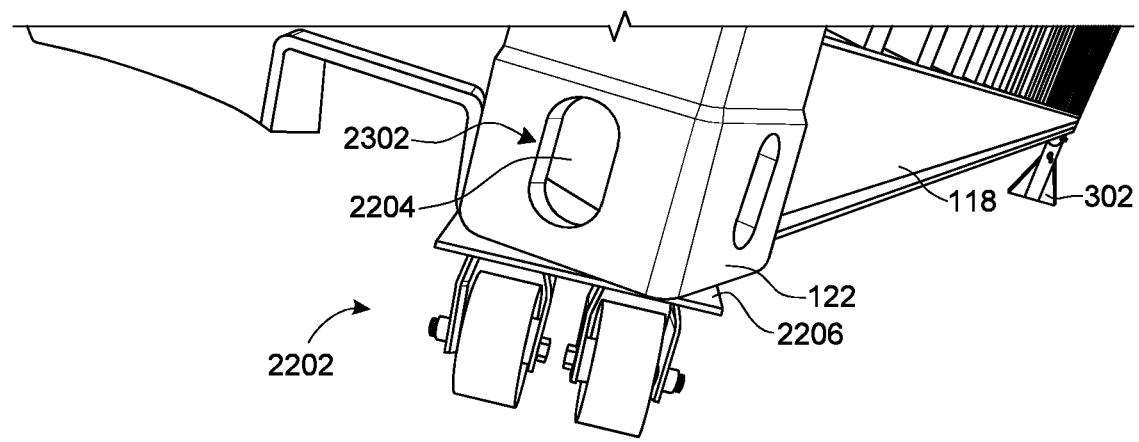
FIG. 23 is an isometric view of the caster skates attached to the corner fittings of the cargo container.

Referring now to FIG. 23, therein is shown an isometric view of the caster skates 2202 attached to the corner fittings 122 of the cargo container 118. The corner fitting 122 is shown having elongated holes 2302. As will be appreciated, the vertical lock 2204 of the caster skates 2202 can be shaped to fit into the elongated holes 2302 in only two orientations, each 180 degrees opposite of each other.

Once the vertical lock 2204 is inserted through the elongated holes 2302 and into the corner fittings 122, the caster skates 2202 can be twisted for locking the caster skates 2202 into position relative to the corner fittings 122. The base plate 2206 of the caster skates 2202 can have a horizontal shape mirroring that of the horizontal shape of the corner fittings 122 for ease of use.

It is contemplated that the jack stands 302 could be used to lift the cargo container 118 up off of the ground in order to place the caster skates 2202 underneath the corner fittings 122 of the cargo container 118. Alternatively, because the caster skates 2202 offer a very low profile, it is contemplated that a 4×4 piece of wood, or something of similar size, could be used to lift the cargo container 118 off the ground and provide enough clearance to mount the caster skates 2202 to the corner fittings 122 of the cargo container 118.

The caster skates 2202 are shown mounted at an angle relative to the cargo container 118; however, it is contemplated that the caster skates 2202 could be mounted directly parallel to the cargo container 118. It is contemplated that both caster skates 2202 should be mounted parallel to each other.

Referring now to FIG. 24, therein is shown an isometric view of placement dollies 2402 in an attachment phase of operation. The placement dollies 2402 are depicted each having a vertical lock 2404.

The vertical lock 2404 can be coupled to a base plate 2406. The base plate 2406 can be coupled to a dolly wheel 2408. The vertical lock 2404 can be inserted within the elongated holes 2302 of the corner fittings 122.

A locking pin can be inserted horizontally through the corner fitting 122 and through the vertical lock 2404. Alternatively, it is contemplated that the vertical lock 2404 of the placement dollies 2402 can be inserted into the elongated holes 2302 of the corner fitting 122 and held in position by gravity. The placement dollies 2402 can be positioned underneath the cargo container 118 and the cargo container 118 lowered down onto the vertical locks 2404 and onto the base plates 2406 of the placement dollies 2402.

Figure 25:
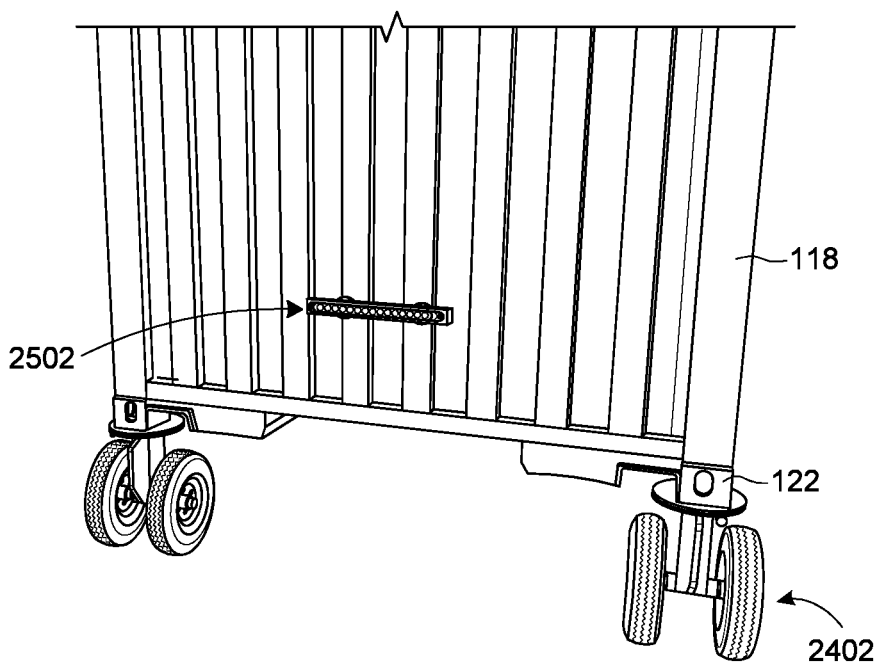
FIG. 25 is an isometric view of the placement dollies attached to the corner fittings of the cargo container.

Referring now to FIG. 25, therein is shown an isometric view of the placement dollies 2402 attached to the corner fittings 122 of the cargo container 118. The base plate 2406 of the placement dollies 2402 can be in direct contact with the corner fittings 122 and provide a stable mechanical connection between the corner fittings 122 of the cargo container 118 and the placement dollies 2402. Additional safety lights 2502 can be affixed to the back of the cargo container 118 between the placement dollies 2402.

Figure 26:
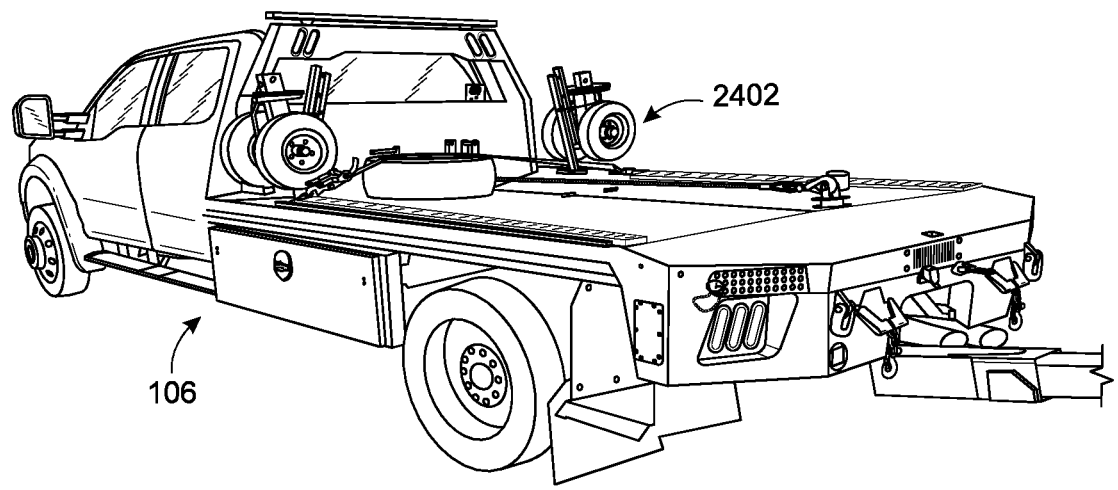
FIG. 26 is an isometric view of the truck having the placement dollies stored thereon.

Referring now to FIG. 26, therein is shown an isometric view of the truck 106 having the placement dollies 2402 stored thereon. The placement dollies 2402 are shown in a storage position that is simultaneously out of the way, easy to access, and easy to store.

Figure 27:
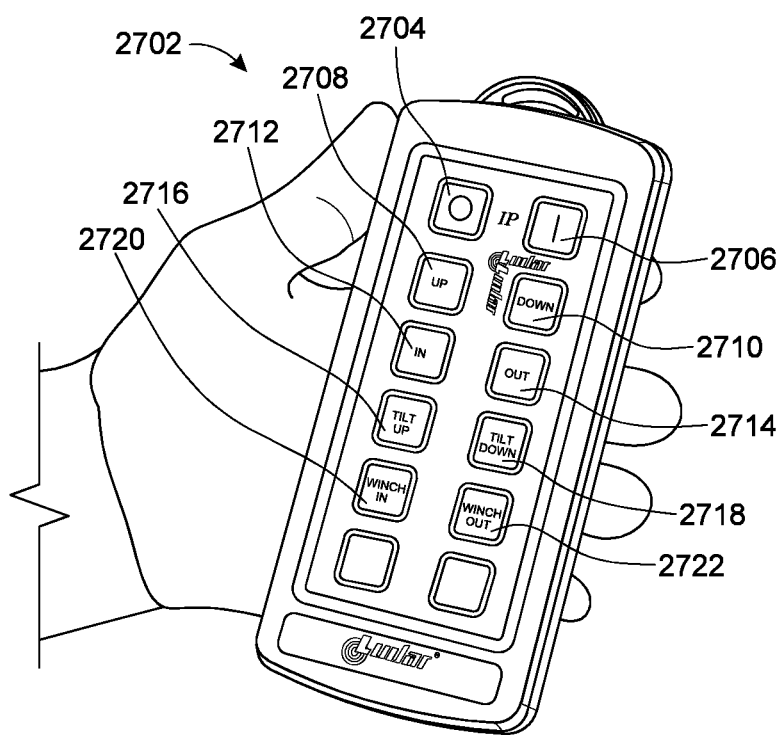
FIG. 27 is an isometric view of a remote control for the transport system.

Referring now to FIG. 27, therein is shown an isometric view of a remote control 2702 for the transport system 100. The remote control 2702 can control the lifting arm 114 of FIG. 1 and the clamping arms 116 of FIG. 1 for the subframe assembly 110 of FIG. 1.

The remote control 2702 can include an on button 2704 and an off button 2706 for turning the remote control 2702 on and off. It is contemplated that the remote control 2702 could also establish communications when the on button 2704 is pressed and the remote control 2702 is operating in a wireless configuration.

The remote control 2702 can further include an up button 2708 and a down button 2710. The up button 2708 and the down button 2710 can move the clamping arms 116 vertically up and down relative to the ground while maintaining clamping arms 116 within the same vertical plane. That is the up button 2708 and the down button 2710 can move the clamping arms 116 vertically up and down without moving in an arc.

The remote control 2702 can further include an in button 2712 and out button 2714. The in button 2712 and the out button 2714 can move the lifting arm 114 in and out with respect to the subframe assembly 110.

The remote control 2702 can further include a tilt up button 2716 and a tilt down button 2718. The tilt up button 2716 and the tilt down button 2718 can tilt the lifting arm 114 up or down in an arc and without simultaneously moving the lifting arm 114 either in or out.

The remote control 2702 can yet further include a winch in button 2720 and a winch out button 2722. The winch in button 2720 and the winch out button 2722 can control a winch mounted on the truck 106 of FIG. 1.

Figure 28:
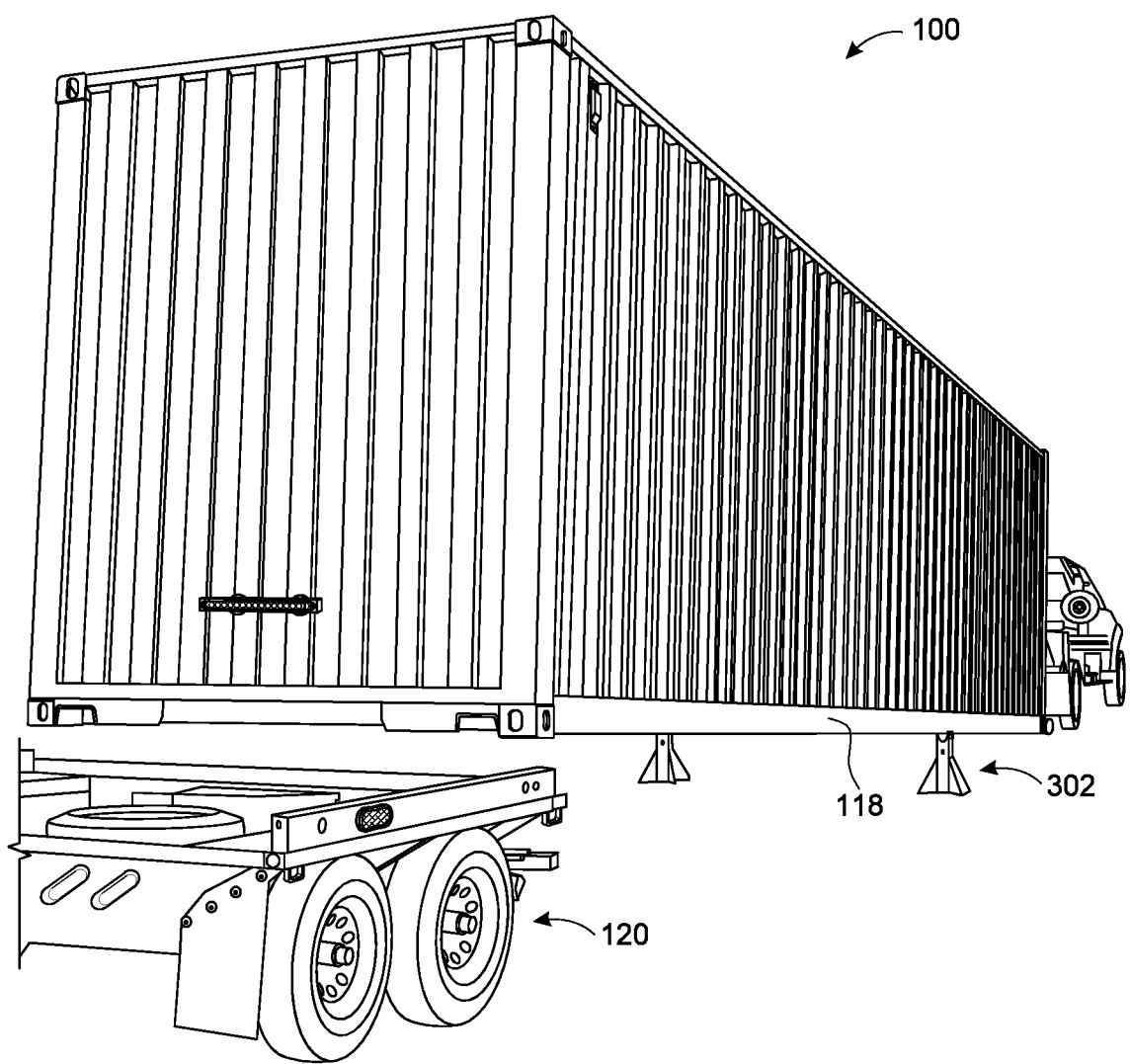
FIG. 28 is a back isometric view of the transport system in a loading phase of operation.

Referring now to FIG. 28, therein is shown a back isometric view of the transport system 100 in a loading phase of operation. The cargo container 118 can be tilted with the jack stands 302 acting as the fulcrum on which the cargo container 118 is tilting.

The cargo container 118 can be affixed to the lifting arm 114 of FIG. 1. The lifting arm 114 can be extended downward toward the ground lifting a back portion of the cargo container 118 up as the cargo container 118 pivots about the jack stands 302.

Further, the container trailer 120 can be moved into position under the cargo container 118. Once the container trailer 120 is in position below the cargo container 118, the lifting arm 114 can be moved upward to the position shown in FIG. 1, the jack stands 302 can be removed and stored, and the cargo straps 132 of FIG. 1 can be affixed.

Figure 29:
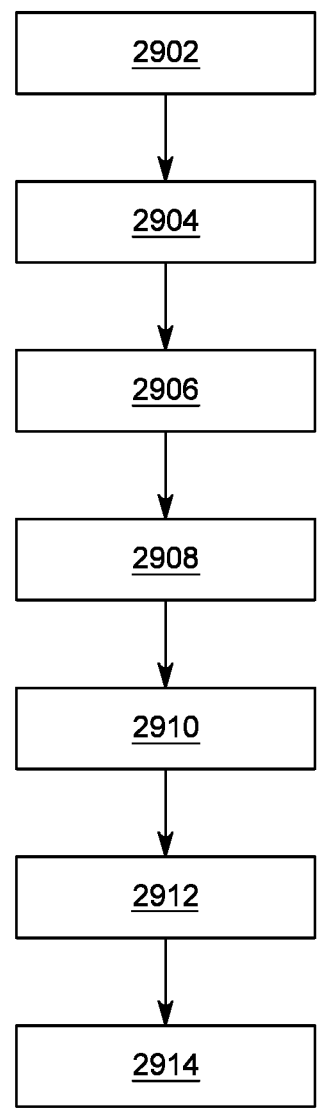
FIG. 29 is a flow chart for a method of operating the transport system.

Referring now to FIG. 29, therein is shown a flow chart for a method of operating the transport system. The flow chart includes providing a vehicle having a truck bed, the truck bed having a subframe assembly coupled thereunder, the subframe assembly including a lifting arm and a clamping arm, the clamping arm including a clamping portion having an extended connection in a block 2902; clamping the clamping arm onto a corner fitting of a cargo container with the extended connection extending into the corner fitting and mating with the corner fitting in a block 2904; raising the lifting arm for raising a portion of the cargo container in a block 2906; inserting a jack stand below the cargo container in a block 2908; lowering the lifting arm for tilting the cargo container on the jack stand, the jack stand configured as a fulcrum in a block 2910; positioning a container trailer below the cargo container, the cargo container including a horizontal rail in a block 2912; and raising the lifting arm for pivoting the cargo container on the jack stand and lowering the cargo container onto the horizontal rail of the container trailer in a block 2914.

It has been discovered that this method of operating the transport system 100 provides many benefits over the numerous other methods of transporting cargo containers 118. However, even though these other methods of transporting cargo containers may be suitable for the specific individual purposes to which they address, they would not be suitable for the purposes of providing a full, all-in-one system of transport. That is, the transport system 100 can pick up, load, position, move, and transport a cargo container 118.

Previous or current available apparatuses, systems, and methods to move cargo containers fail to address the innovative and unique features as found in the transport system 100. An object of the transport system 100 is to provide an all-in-one solution to cargo container load, unload, transport, and storage.

It has further been discovered that since there are only two contact points between the transport system 100 and the cargo container 118, any size of cargo container 118 can be loaded, secured, and transported with the transport system 100. The transport system 100 is therefore expandable to fit any size of cargo container.

It has been discovered that this dependability greatly increases the utility of the transport system 100 while decreasing costs. The reduction in costs is due to the fact that a large flatbed sized for each specific cargo container size does not need to be manufactured or towed.

As will be appreciated therefore, the transport system 100 utilizing the container trailer 120 and the subframe assembly 110 as described herein greatly decreases overall costs in traditional applications of moving cargo containers. This reduces material costs as well as fuel and insurance costs.

Another benefit of the transport system 100 is that the transport system 100 does not require the need of additional equipment at pick up or delivery location of the cargo containers such as forklifts. Yet another benefit of the transport system 100 is that users can operate the transport system 100 with a class C driver's license, reducing cost of labor and increasing the talent pool from which to recruit.

Yet another benefit of the transport system 100 is that standard commercial and civilian trucks can be used, which do not require special licenses, or governmental restrictions and which are less expensive to operate versus larger traditional tow vehicles currently in use. Yet another benefit of the transport system 100 is the ability to move and reposition cargo containers, which is more fuel efficient than other traditional apparatuses, systems, and methods on the market today.

Yet another benefit of the transport system 100 is to provide an apparatus, system, and method to move cargo containers, which costs lets to insure. Yet another benefit of the transport system 100 is that it can access locations for pick-up and delivery, which traditional transporters cannot access because the transport system 100 can operate in less space and in areas that are too small for certain types and sizes of vehicles, such as Class 6 vehicles.

Yet another benefit of the transport system 100 is that the transport system 100 can handle any container size and requires only one container trailer to deliver cargo containers from the port to end-user. Yet another benefit of the transport system 100 is that the transport system 100 can utilize a truck capable of hauling and delivering cargo containers sitting on the ground with only a single operator. The transport system 100 thus eliminates the need for expensive tractors, trailers, and forklifts.

Yet another benefit of the transport system 100 is that the lifting arm 114 of FIG. 1 is configured to handle containers of all sizes with a cross bar rating of 6500 lbs, is adaptable to vehicles and containers, and can be operated by wireless remote. Further, the truck bed 112 provides storage area for an additional cargo trailer and other system components if transportation of multiple cargo containers is needed or desired.

Thus, the transport system 100 has been discovered to reduce the acquisition costs providing an all-in-one solution to loading, unloading, positioning, and transporting any size of cargo container 118. The transport system 100 therefore reduces the number of equipment units necessary to load, unload, position, and transport different container sizes.

The transport system 100 has further been discovered to reduce the steps, equipment and personal to pick up, transport, and deliver cargo containers. The transport system 100 solve the problem of low supply of drivers who have a commercial driver license and class A license, by developing and creating the transport system 100 which can be operated by a regular class C driver's license. This increases the supply of talent available to hire and reduces the labor cost.

The transport system 100 has also been discovered to solve the problem of carbon emissions by using more fuel-efficient vehicles and by reducing the number of trucks on the road necessary to do the jobs. The transport system 100 can further solve the problem of high insurance cost, by replacing expensive equipment with a less expensive alternative, results in cheaper replacement cost.

The transport system 100 further increases the accessibility of cargo container 118 to small spaces currently unavailable to modern transport and delivery vehicles. That is the transport system 100 is capable of operating in much less space, thus opening up confined markets in urban communities. This is due to the smaller vehicle required and the smaller, nimbler container trailer 120.

Thus, it has been discovered that the transport system 100 furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the transport system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. A method of operating a container transport system comprising:
    providing a vehicle having a truck bed, the truck bed having a subframe assembly coupled thereunder, the subframe assembly including a lifting arm and a clamping arm, the clamping arm including a clamping portion having an extended connection;
    clamping the clamping arm onto a corner fitting of a cargo container with the extended connection extending entirely through the corner fitting, and wherein clamping the clamping arm onto the corner fitting of the cargo container includes moving the clamping arm laterally out away from the lifting arm or closer toward the lifting arm based on the clamping arm moving along a horizontal arm, the horizontal arm being within the clamping arm;
    raising the lifting arm for raising a portion of the cargo container;
    inserting a jack stand below the cargo container;
    lowering the lifting arm for tilting the cargo container on the jack stand, the jack stand configured as a fulcrum;
    positioning a container trailer below the cargo container, the container trailer including a horizontal rail; and
    raising the lifting arm for pivoting the cargo container on the jack stand and lowering the cargo container onto the horizontal rail of the container trailer.

2. The method of claim 1 wherein:
    positioning the container trailer includes positioning the container trailer having vertical rails; and
    raising the lifting arm includes raising the lifting arm for pivoting the cargo container on the jack stand and lowering the cargo container between the vertical rails of the container trailer.

3. The method of claim 1 wherein clamping the clamping arm onto the corner fitting of the cargo container includes clamping the clamping arm onto the corner fitting, the corner fitting being ISO compliant.

4. The method of claim 1 further comprising storing the container trailer on top of the truck bed based on the cargo container being unloaded.

5. A container transport system comprising:
    a vehicle having a subframe assembly coupled thereto, the subframe assembly including a lifting arm and a clamping arm, the clamping arm configured to clamp onto a corner fitting of a cargo container, the lifting arm configured to raise a portion of the cargo container, the vehicle includes a truck bed, the truck bed includes the subframe assembly coupled thereunder, the clamping arm includes a clamping portion having an extended connection, the clamping arm configured to clamp onto the corner fitting of the cargo container with the extended connection extending entirely through the corner fitting;

a jack stand for inserting below the cargo container, and the lifting arm is configured to lower for tilting the cargo container on the jack stand, the jack stand configured as a fulcrum; and a container trailer configured for positioning below the cargo container, and the lifting arm is configured to raise for pivoting the cargo container on the jack stand and lowering the cargo container onto the container trailer, the container trailer includes a horizontal rail, the lifting arm configured to pivot the cargo container on the jack stand and lower the cargo container onto the horizontal rail of the container trailer.

6. The system of claim 5 further comprising a cargo strap for securing the cargo container to the container trailer with the cargo strap coupled to the container trailer and around the cargo container.

7. The system of claim 5 wherein:

the lifting arm includes a collapsing extension and a rotational coupling; and the lifting arm is configured to extend or retract the collapsing extension of the lifting arm, rotate the rotational coupling of the lifting arm, or a combination thereof with a remote control.

8. The system of claim 5 wherein the subframe assembly includes a cylinder coupled to the lifting arm for raising and lowering the lifting arm.

9. The system of claim 5 further comprising a caster skate or a placement dolly mounted to the corner fitting.

10. The system of claim 5 wherein the container trailer includes vertical rails, and the lifting arm is configured to raise for pivoting the cargo container on the jack stand to lower the cargo container between the vertical rails of the container trailer.

11. The system of claim 5 wherein the clamping arm is configured to move laterally out away from the lifting arm or closer toward the lifting arm based on the clamping arm moving along a horizontal arm, the horizontal arm being within the clamping arm.

12. The system of claim 5 wherein the corner fitting is ISO compliant.

13. The system of claim 5 wherein the container trailer is configured to be stored on top of the truck bed based on the cargo container being unloaded.

\* \* \* \* \*